C. O. BARNES.
MAIL DISTRIBUTING APPARATUS.
APPLICATION FILED MAR. 14, 1916.
1,410,446.
Patented Mar. 21, 1922.
23 SHEETS—SHEET 13.
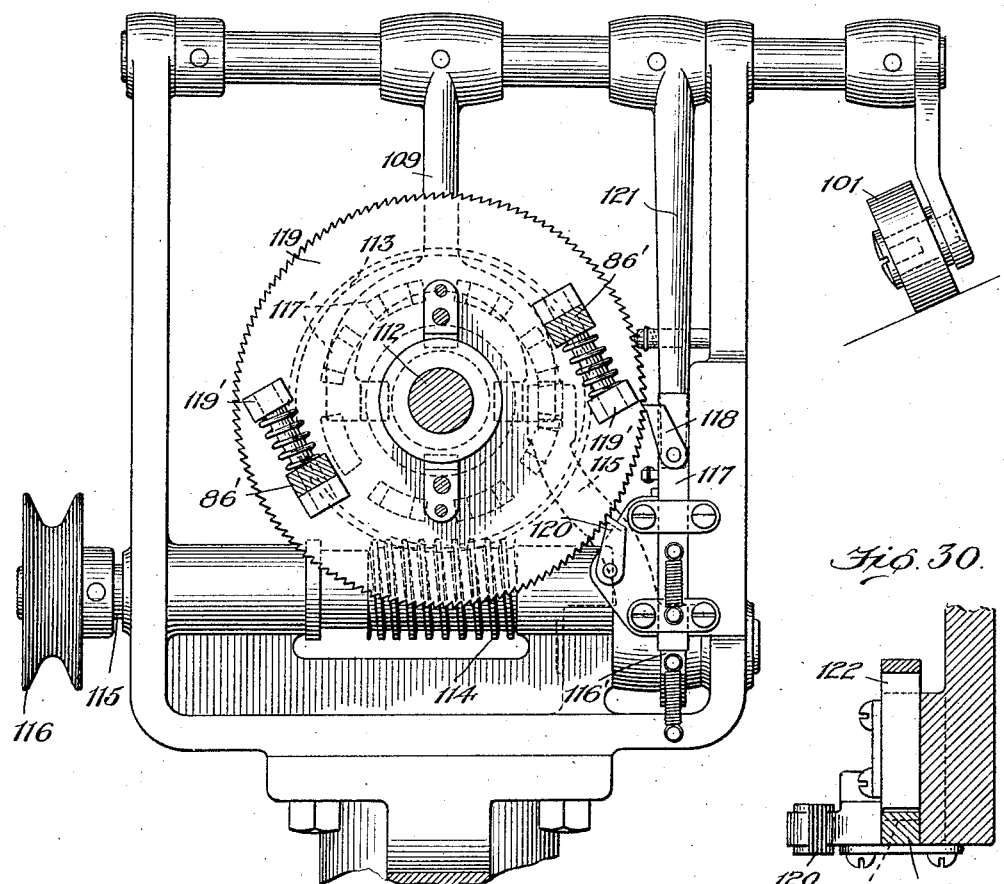
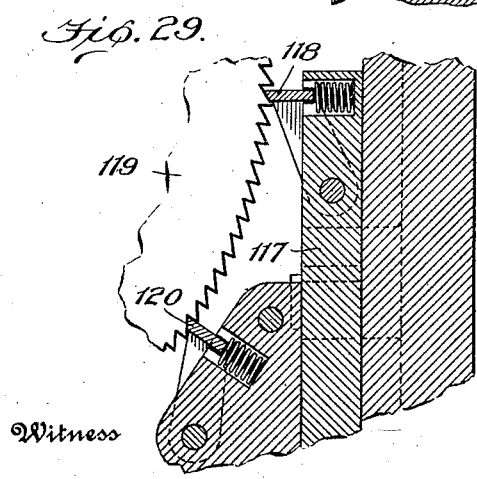
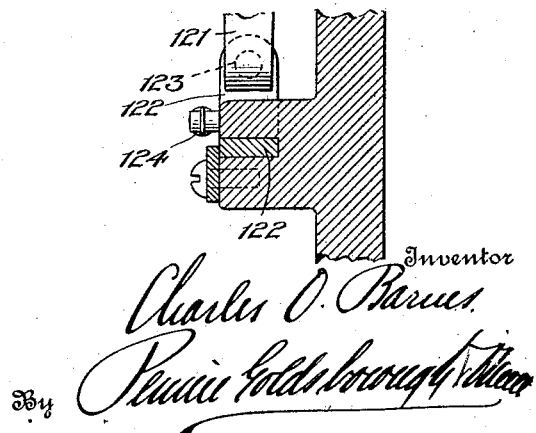
Witness
Edwin L. Bradford
Inventor
Charles O. Barnes,
By Pennie Goldsborough ...
Attorneys

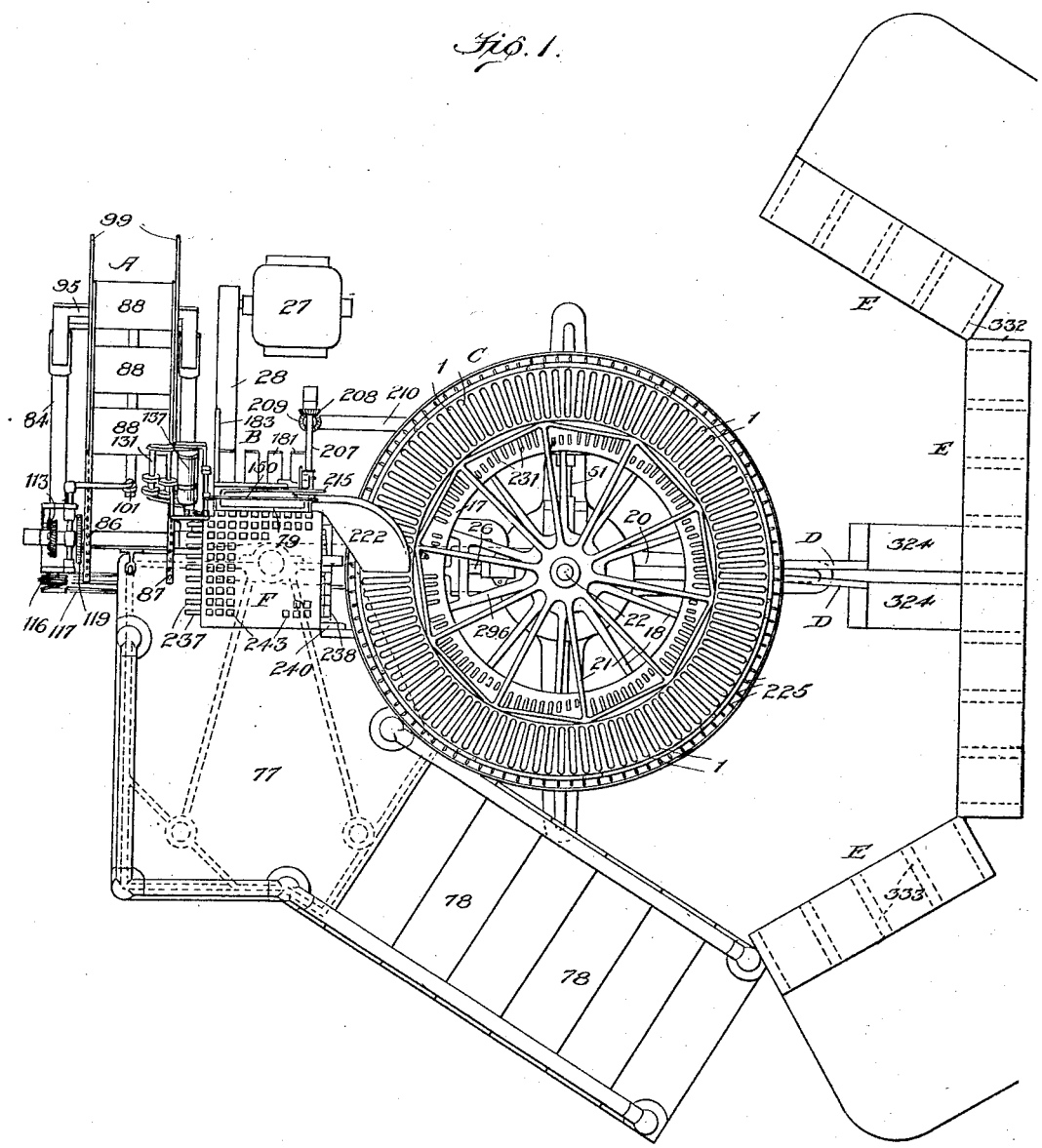

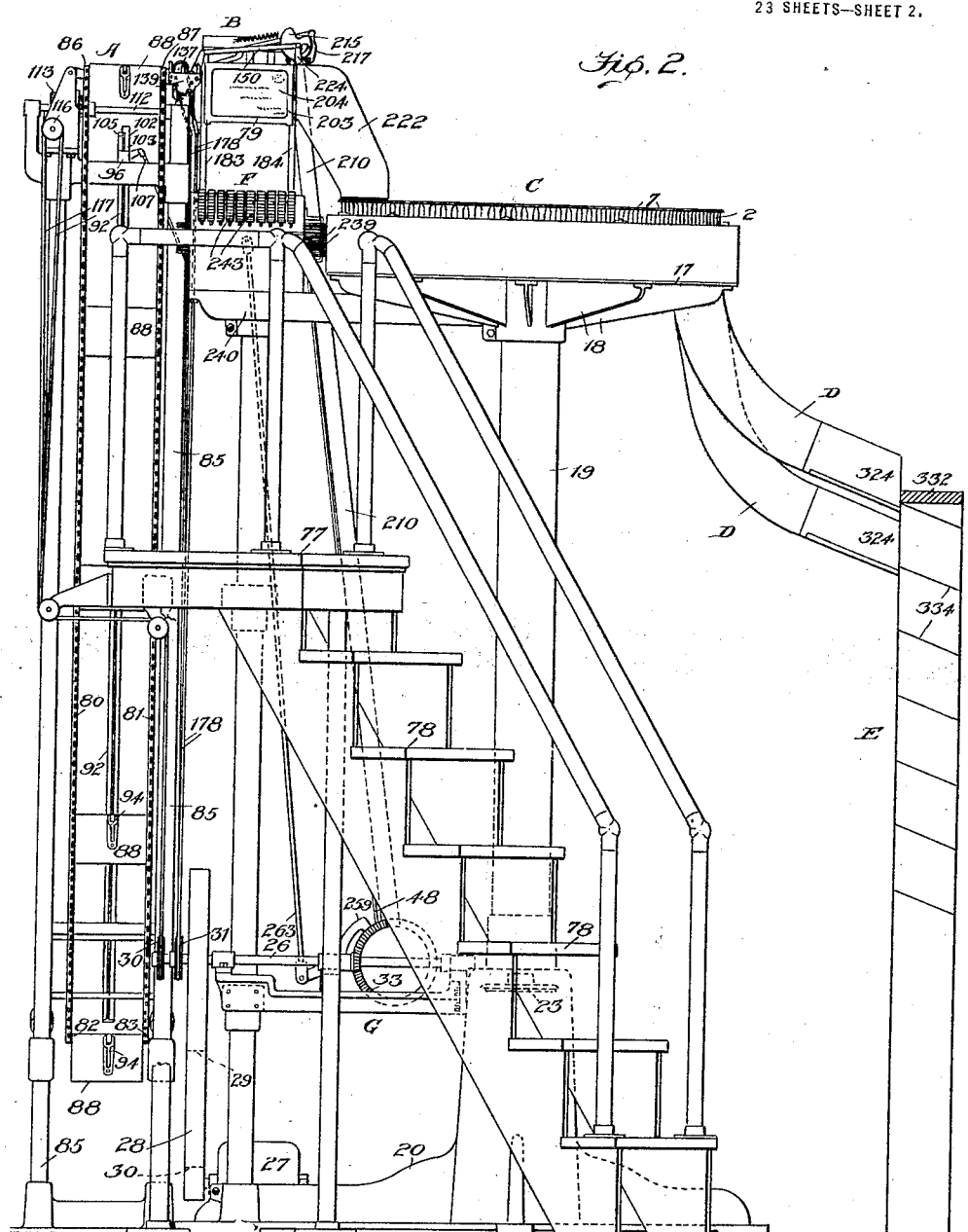

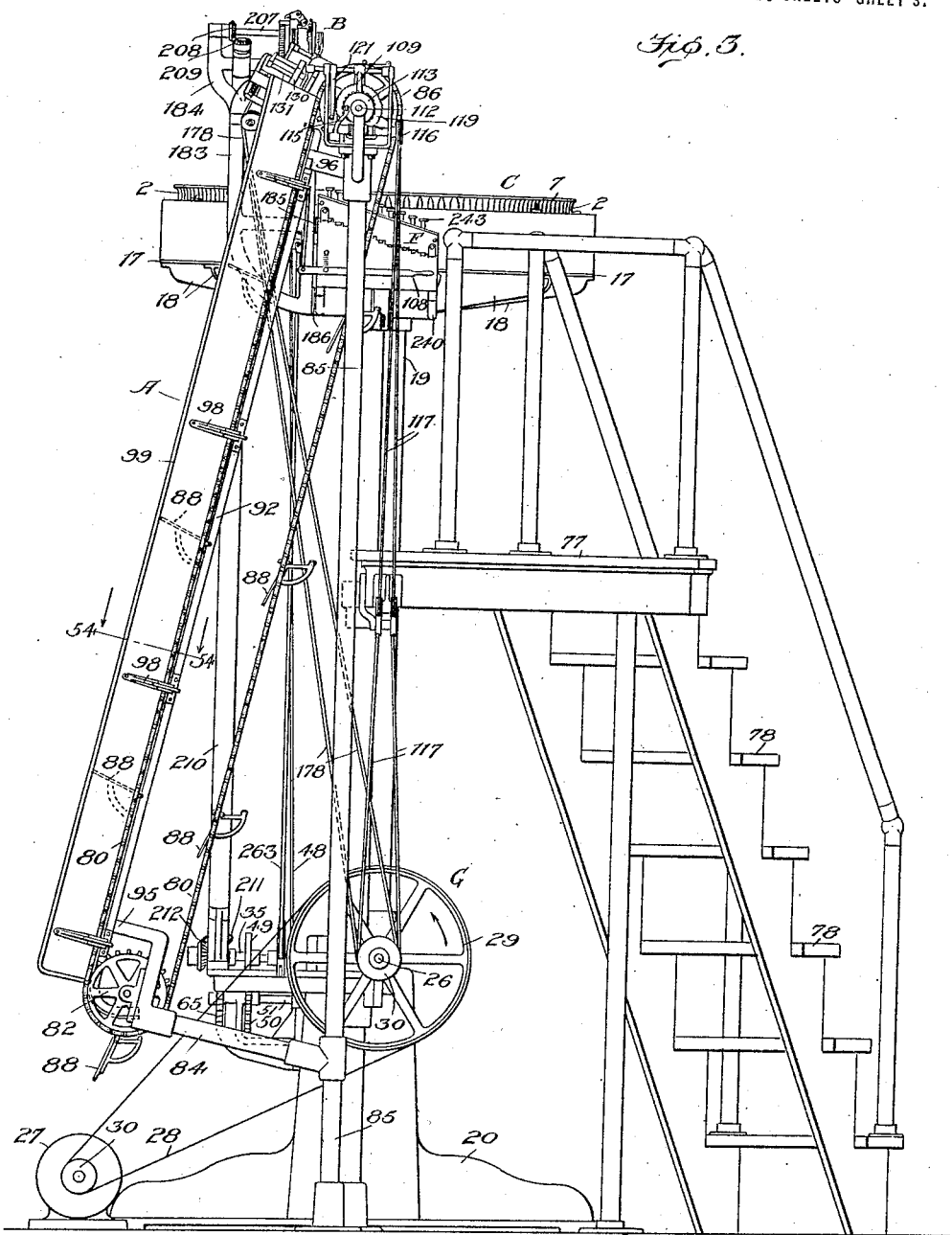

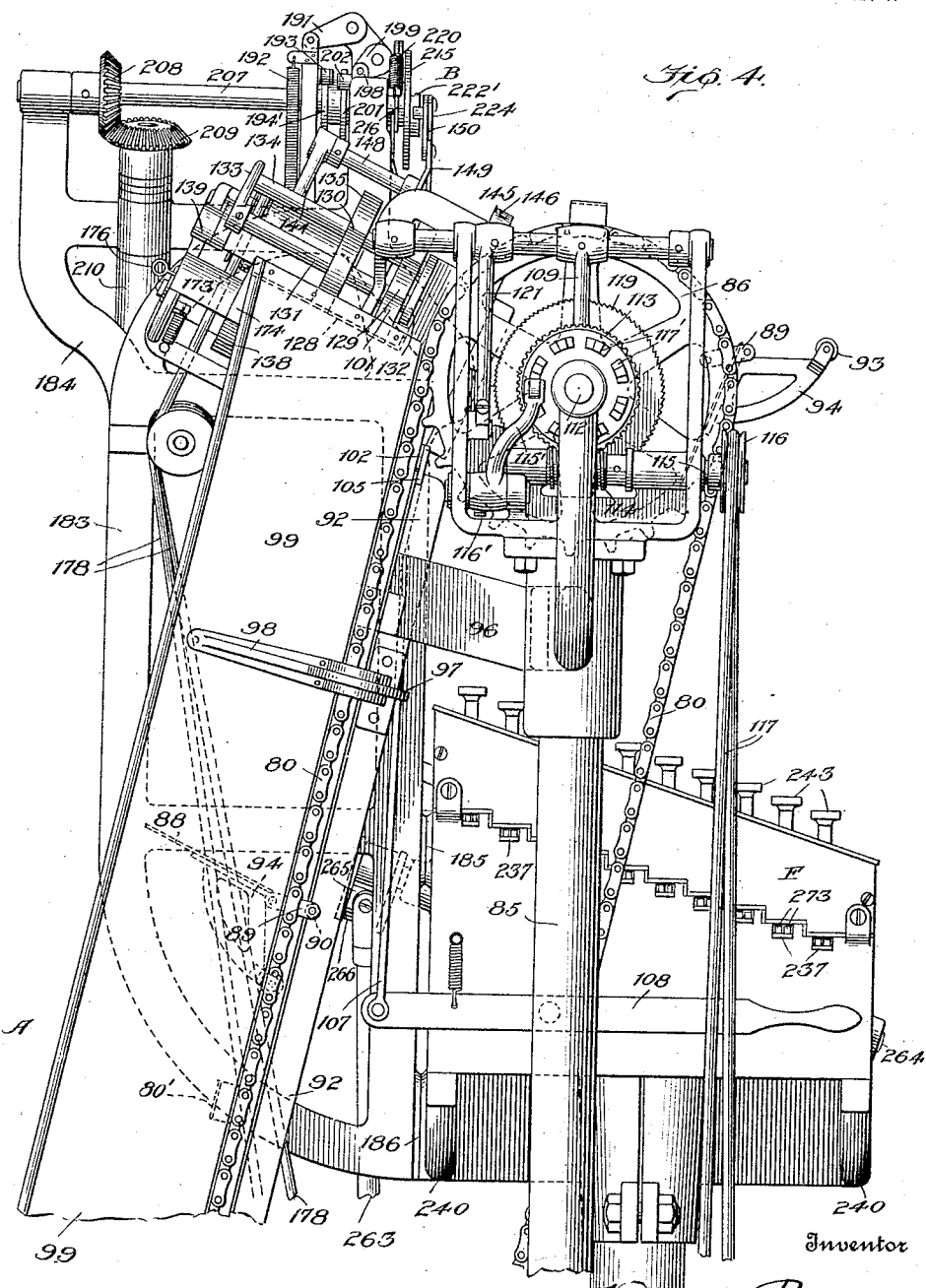

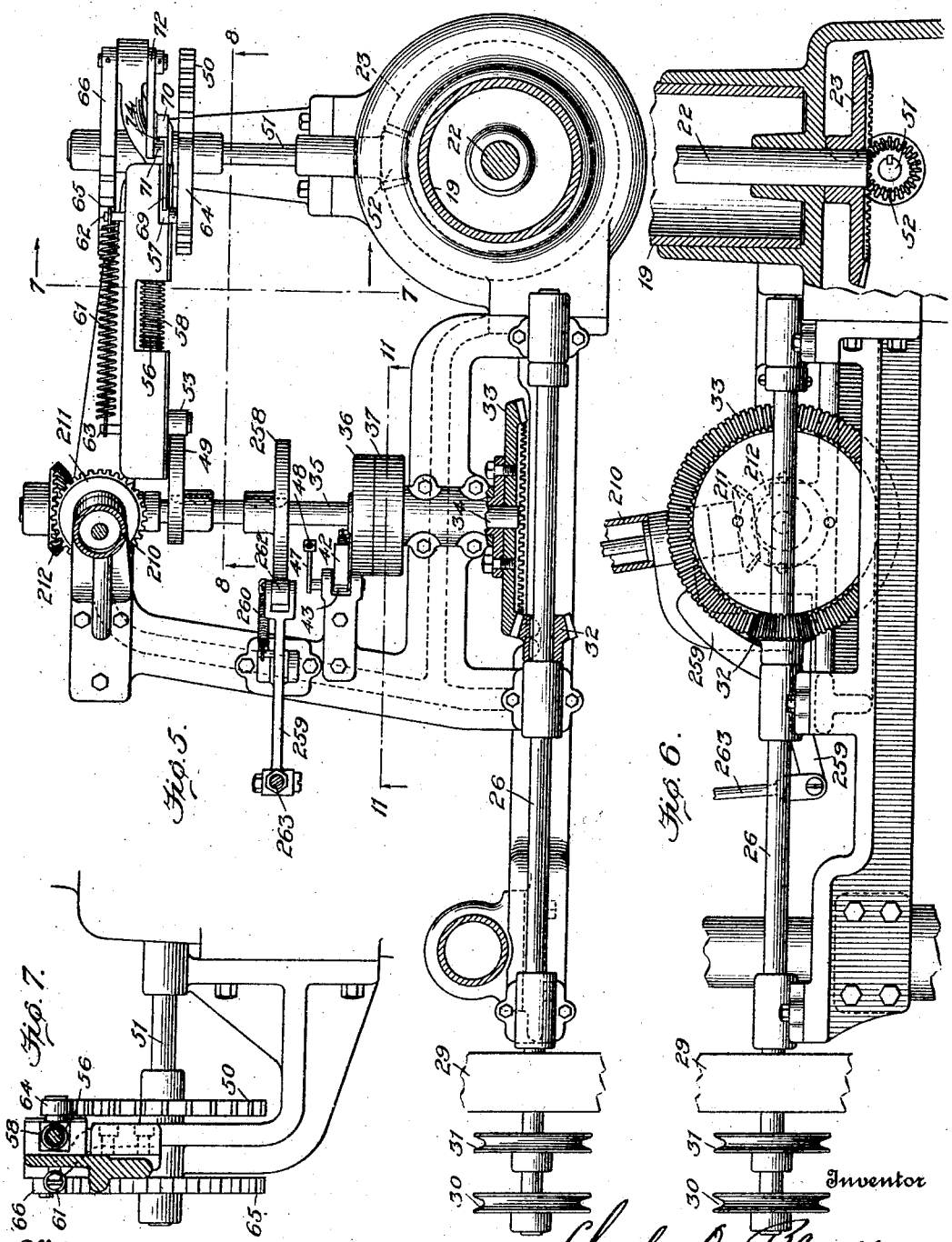

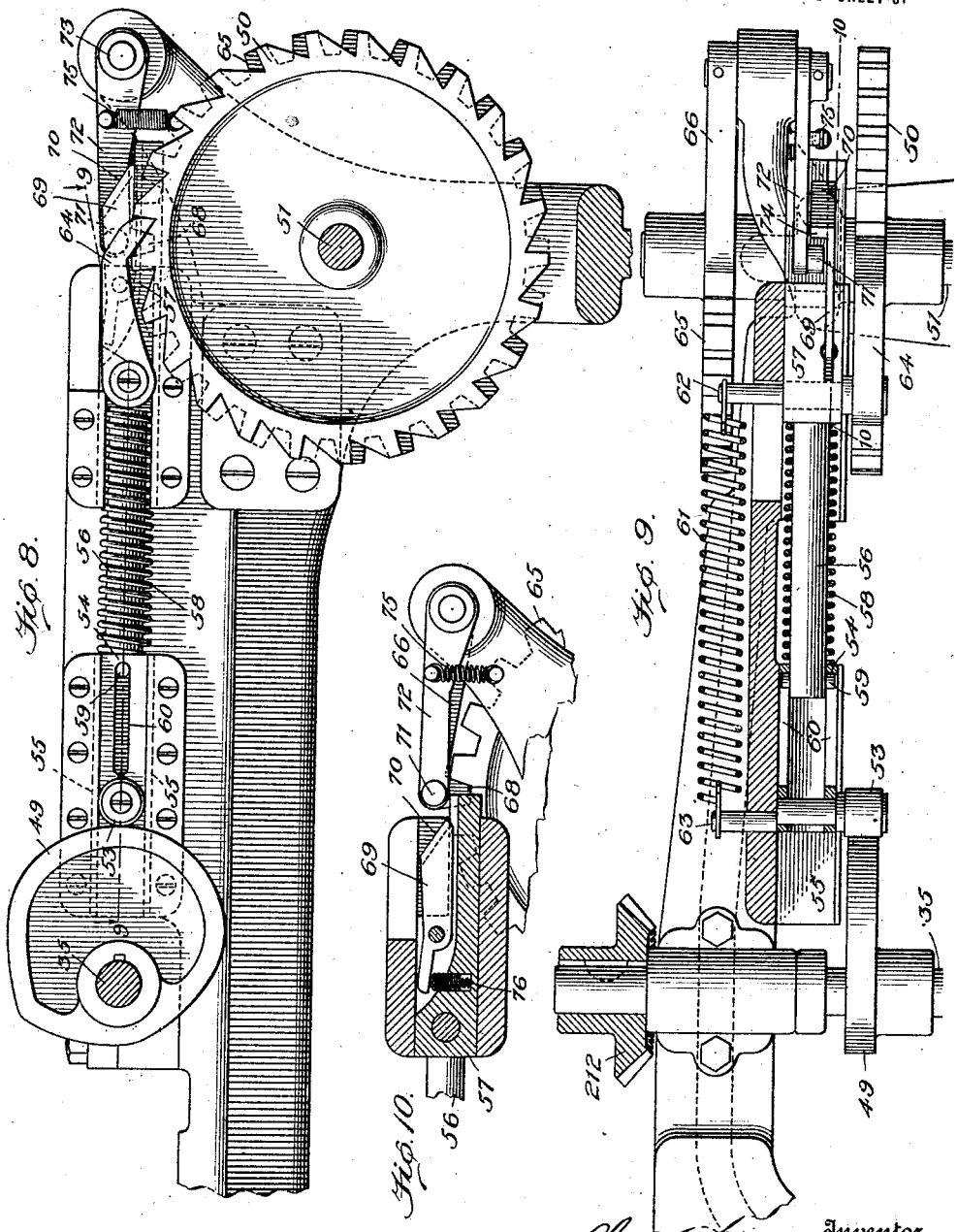

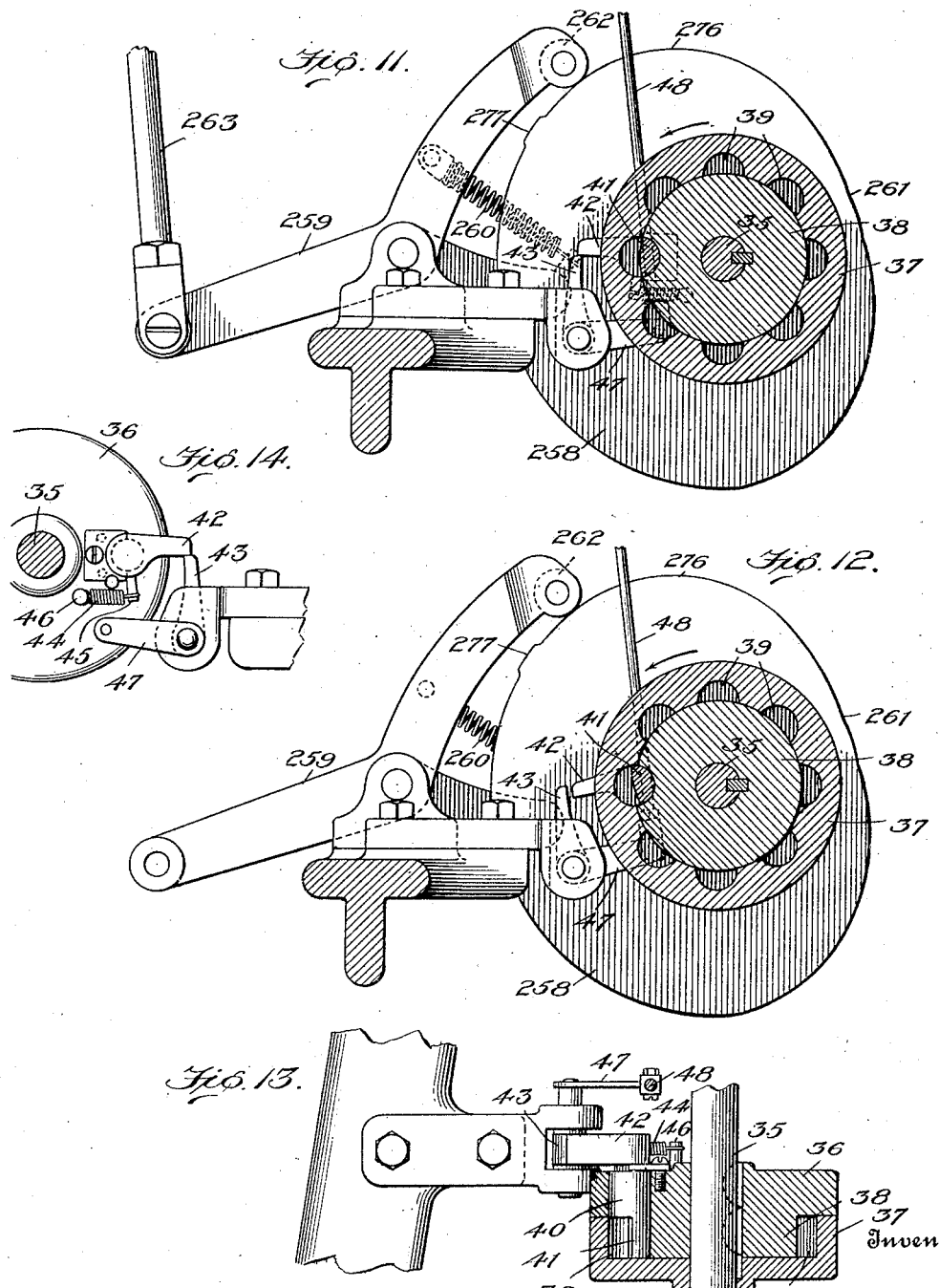

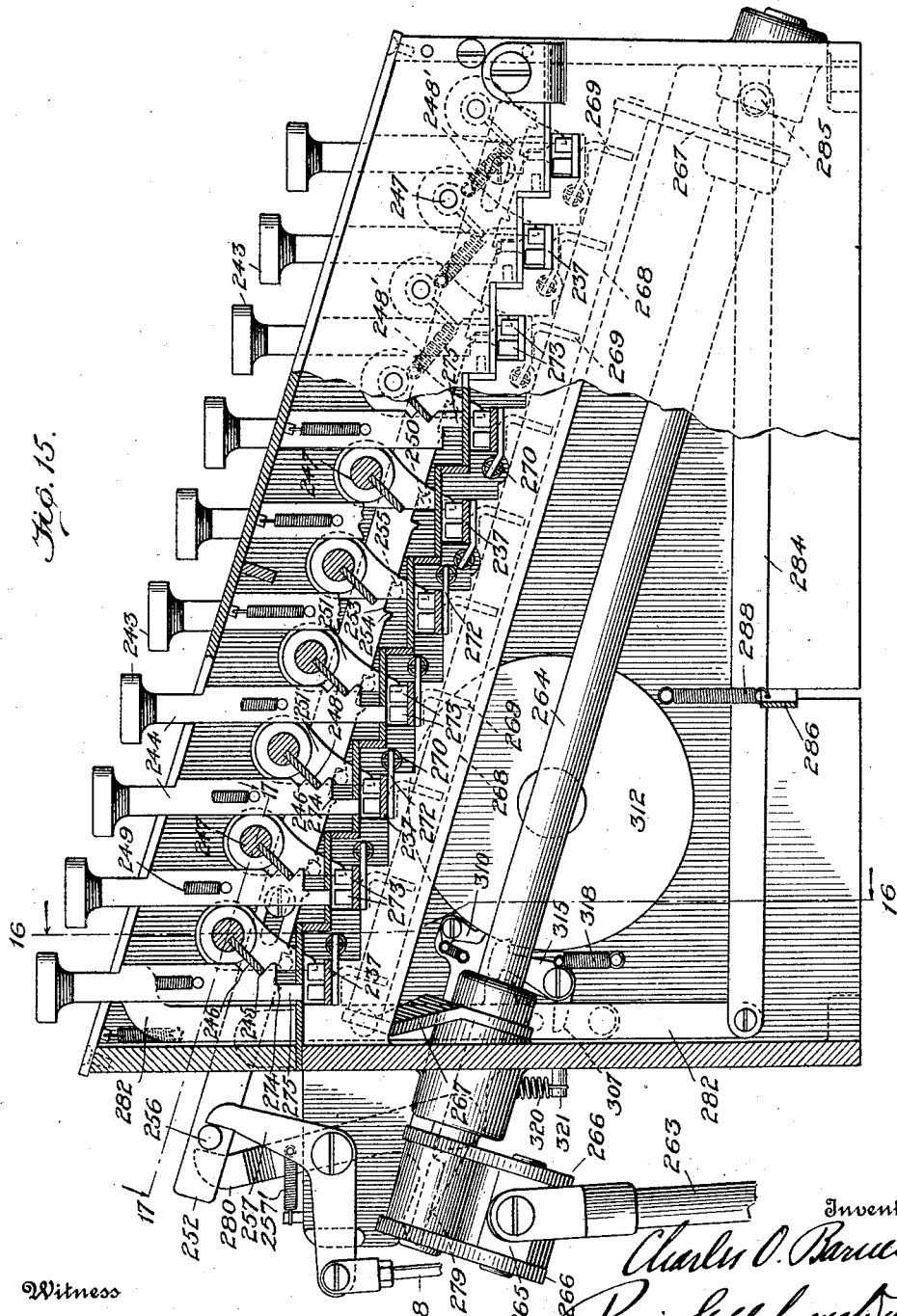

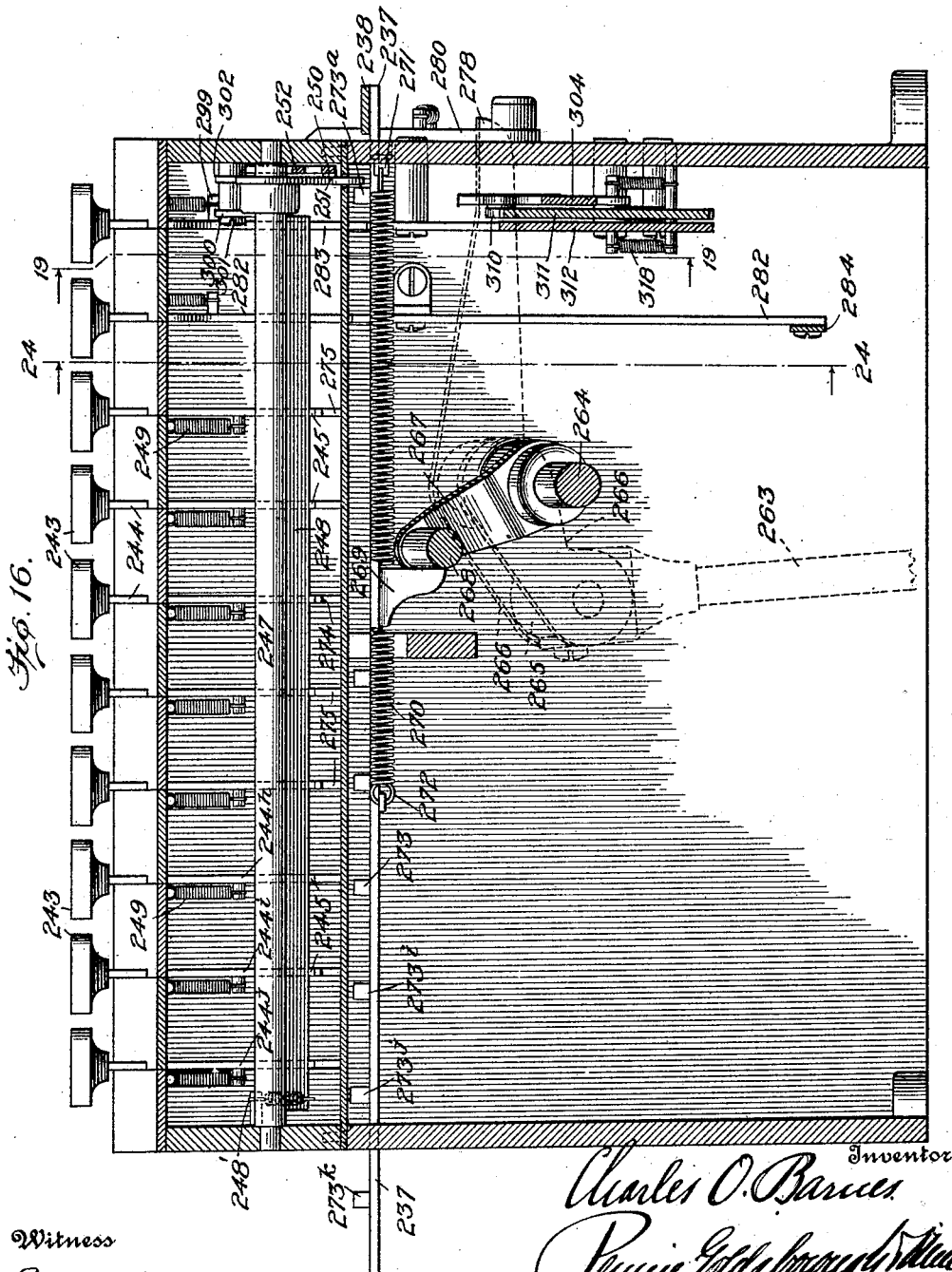

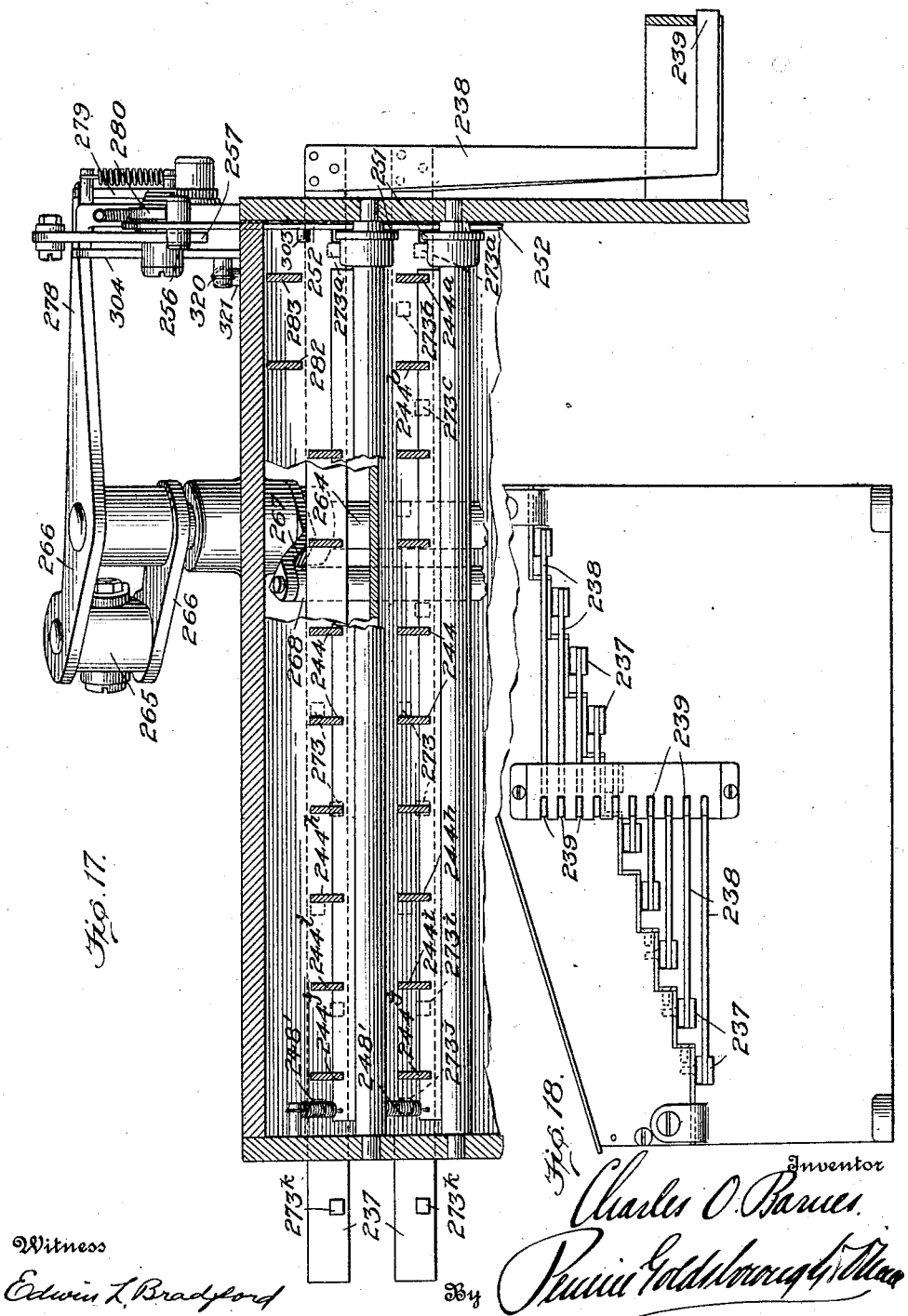

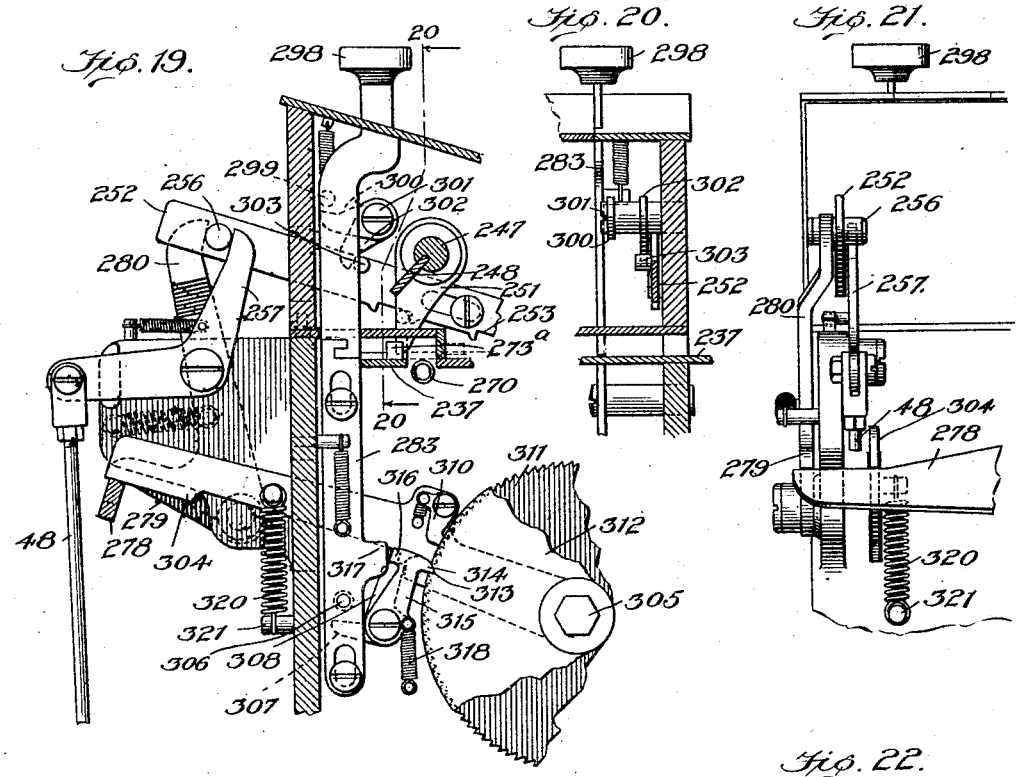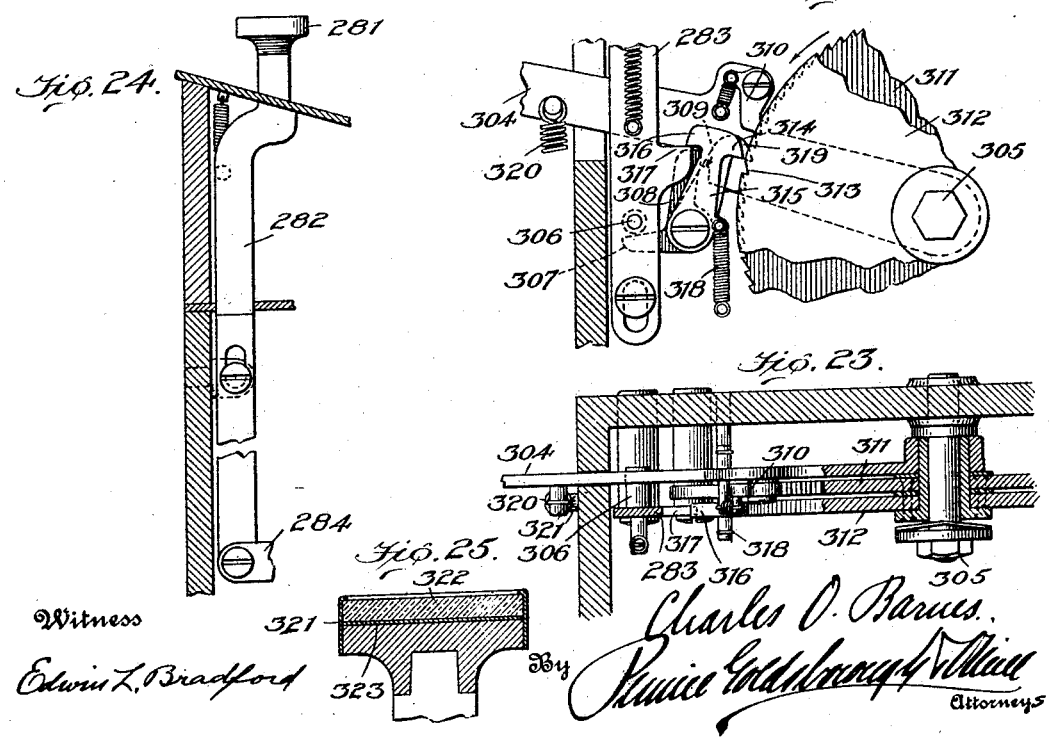

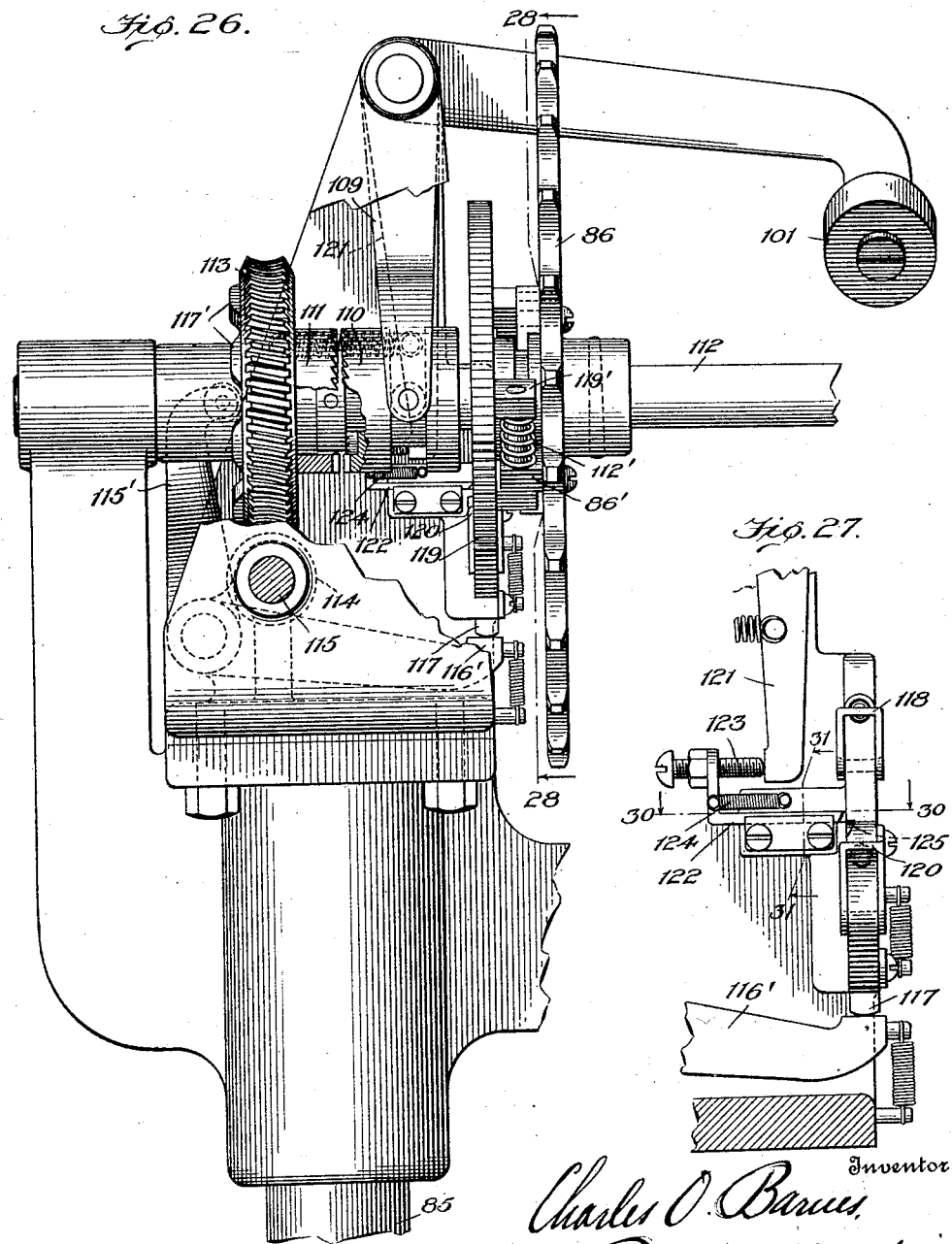

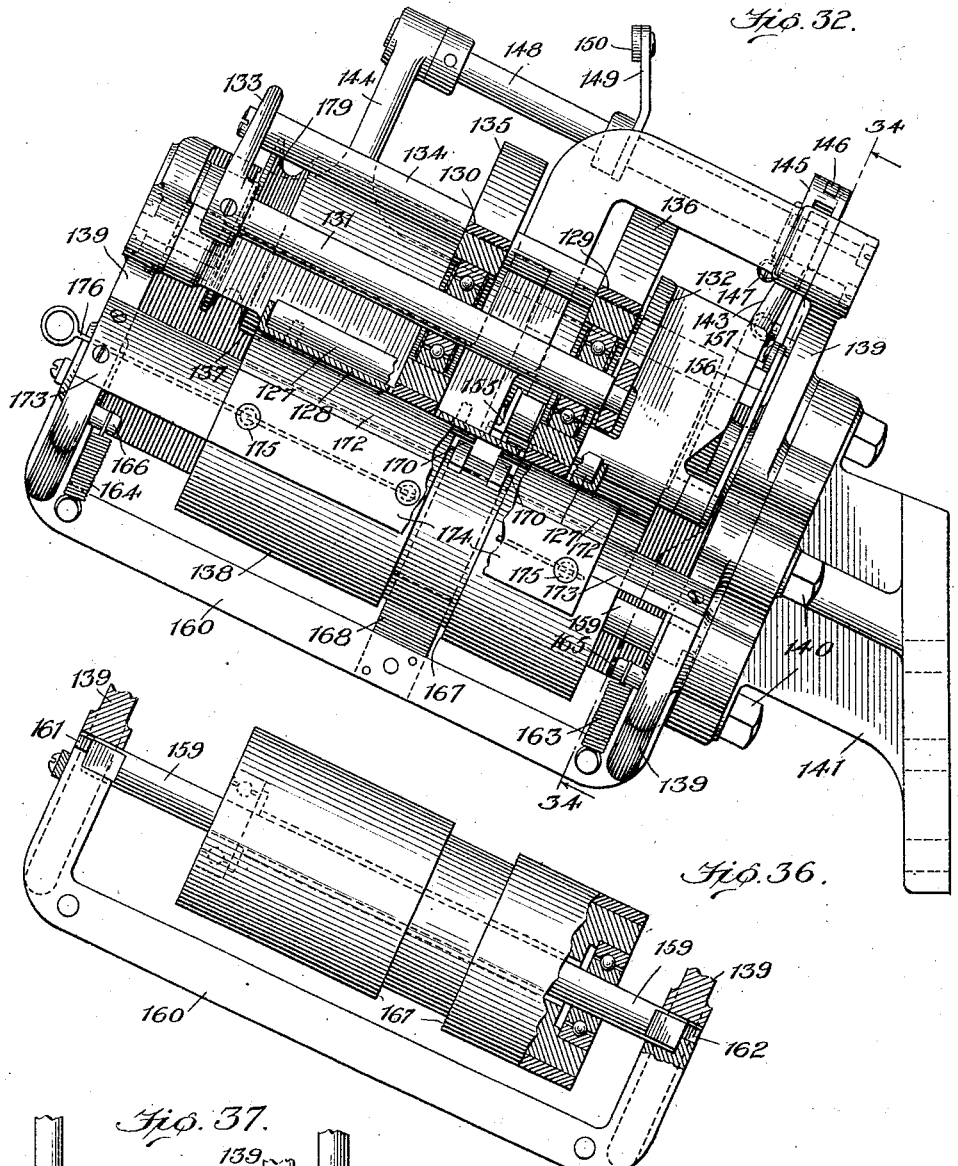
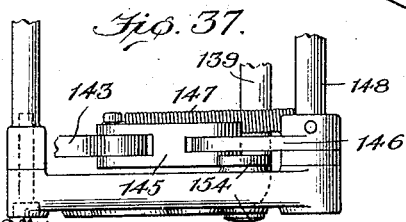

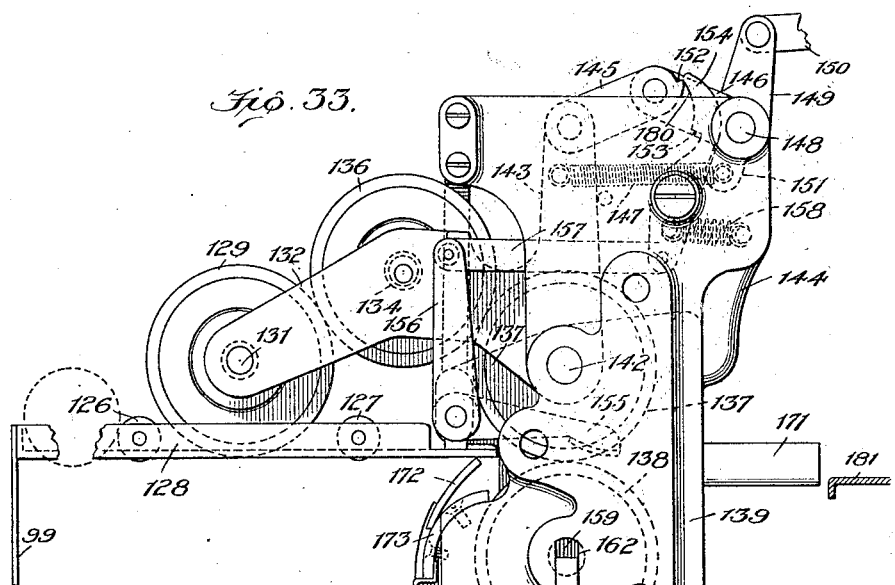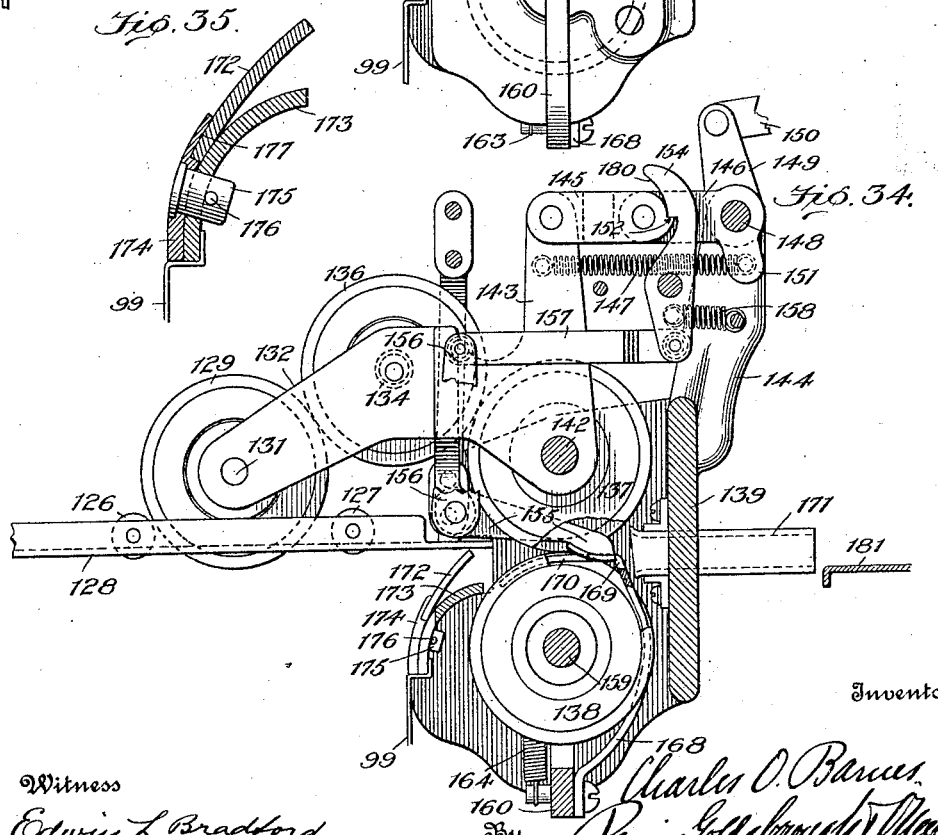

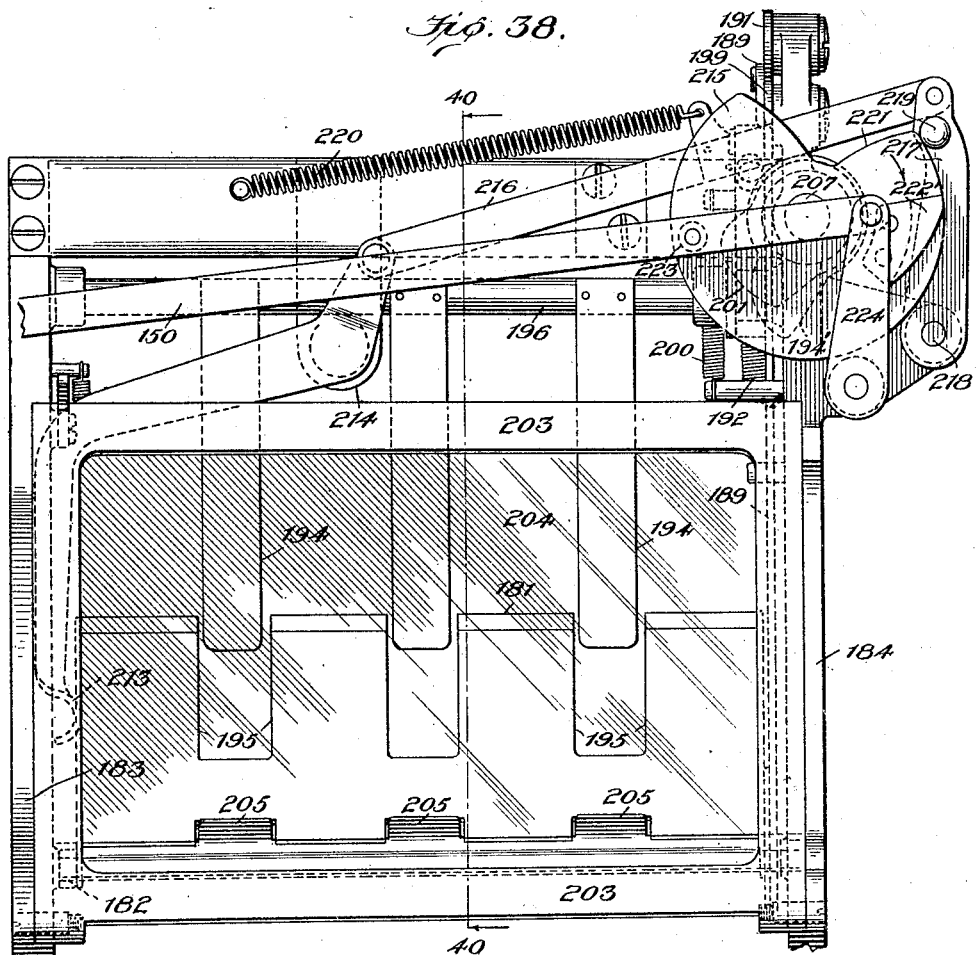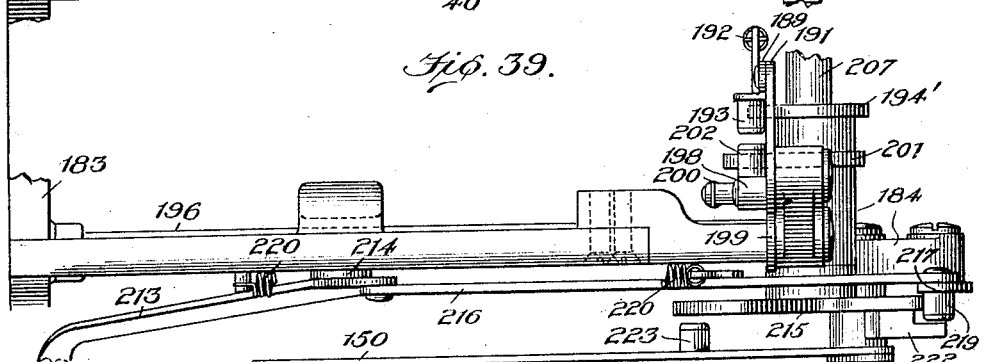

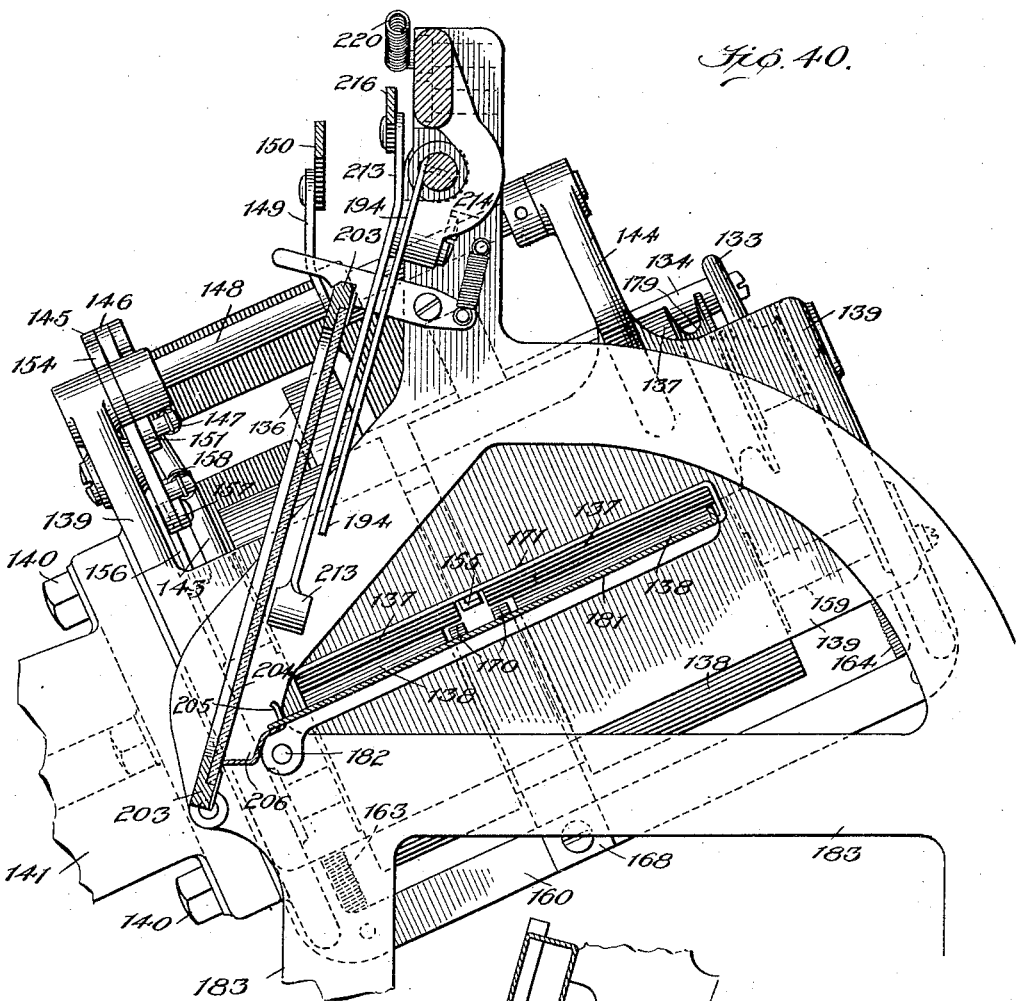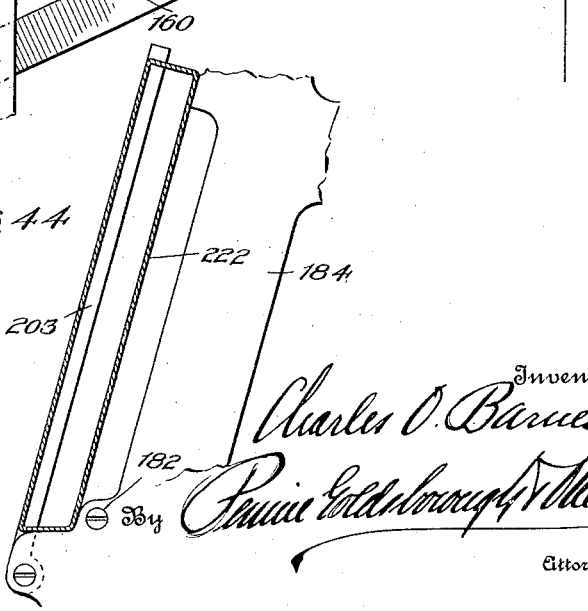

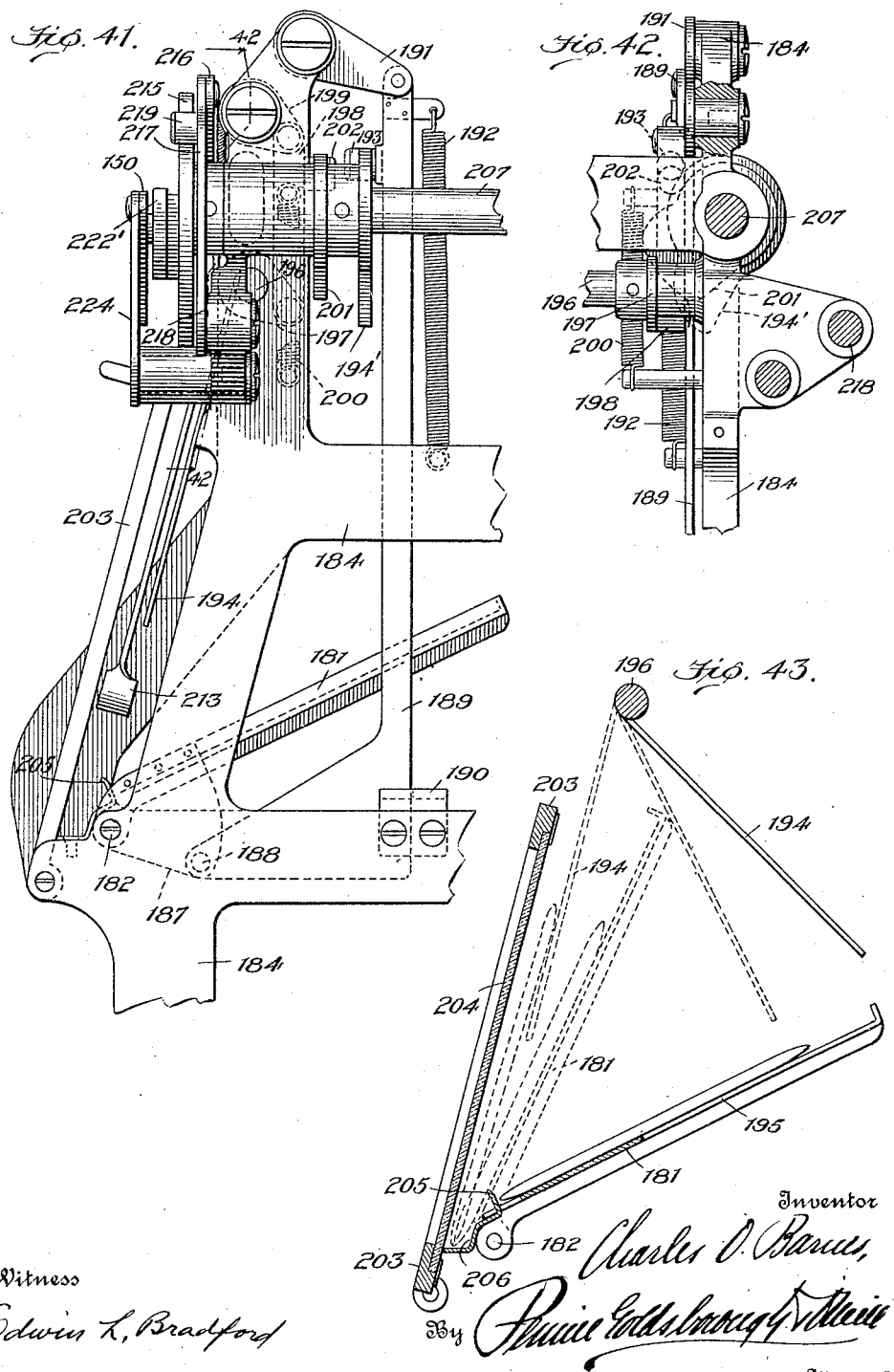

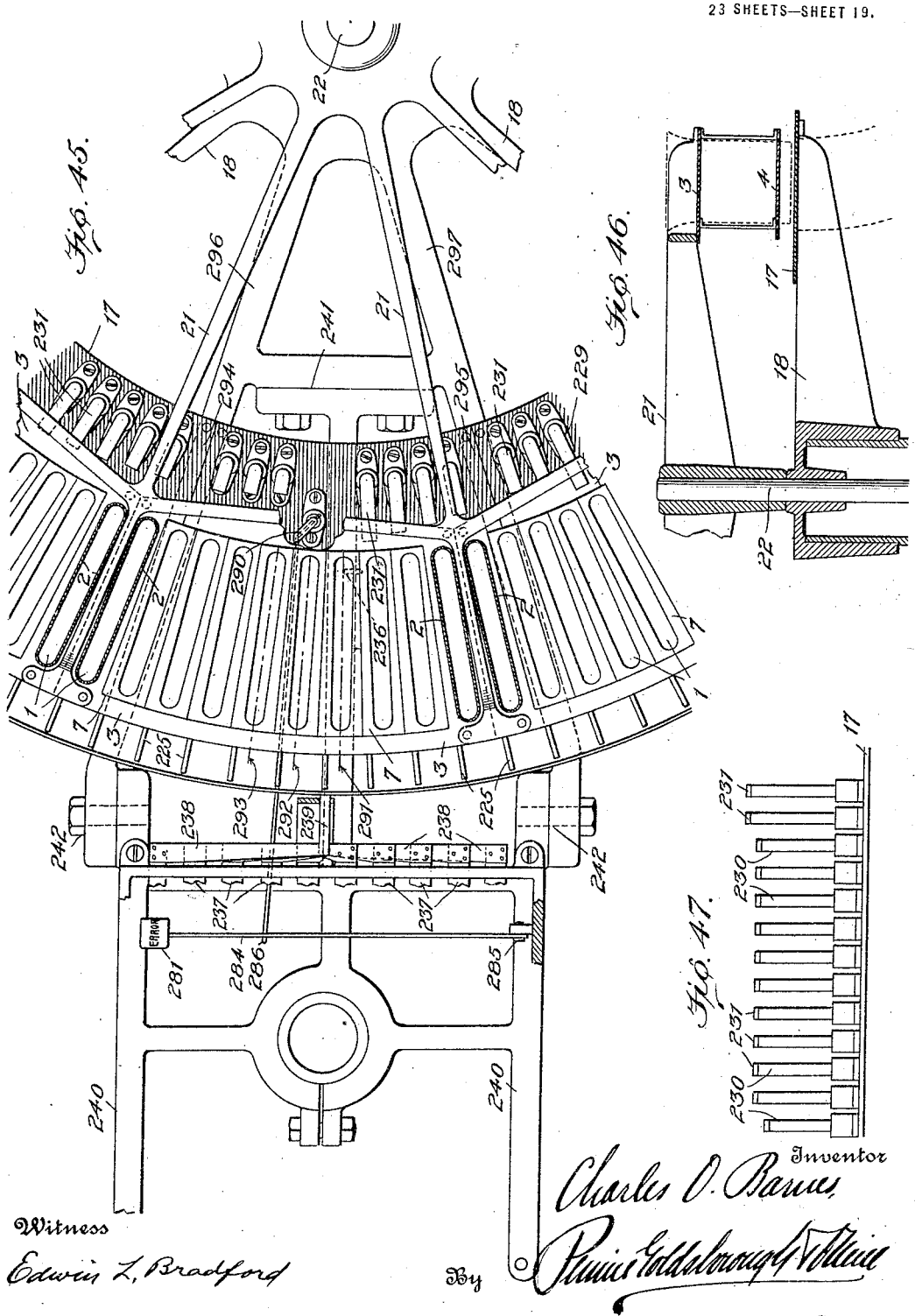

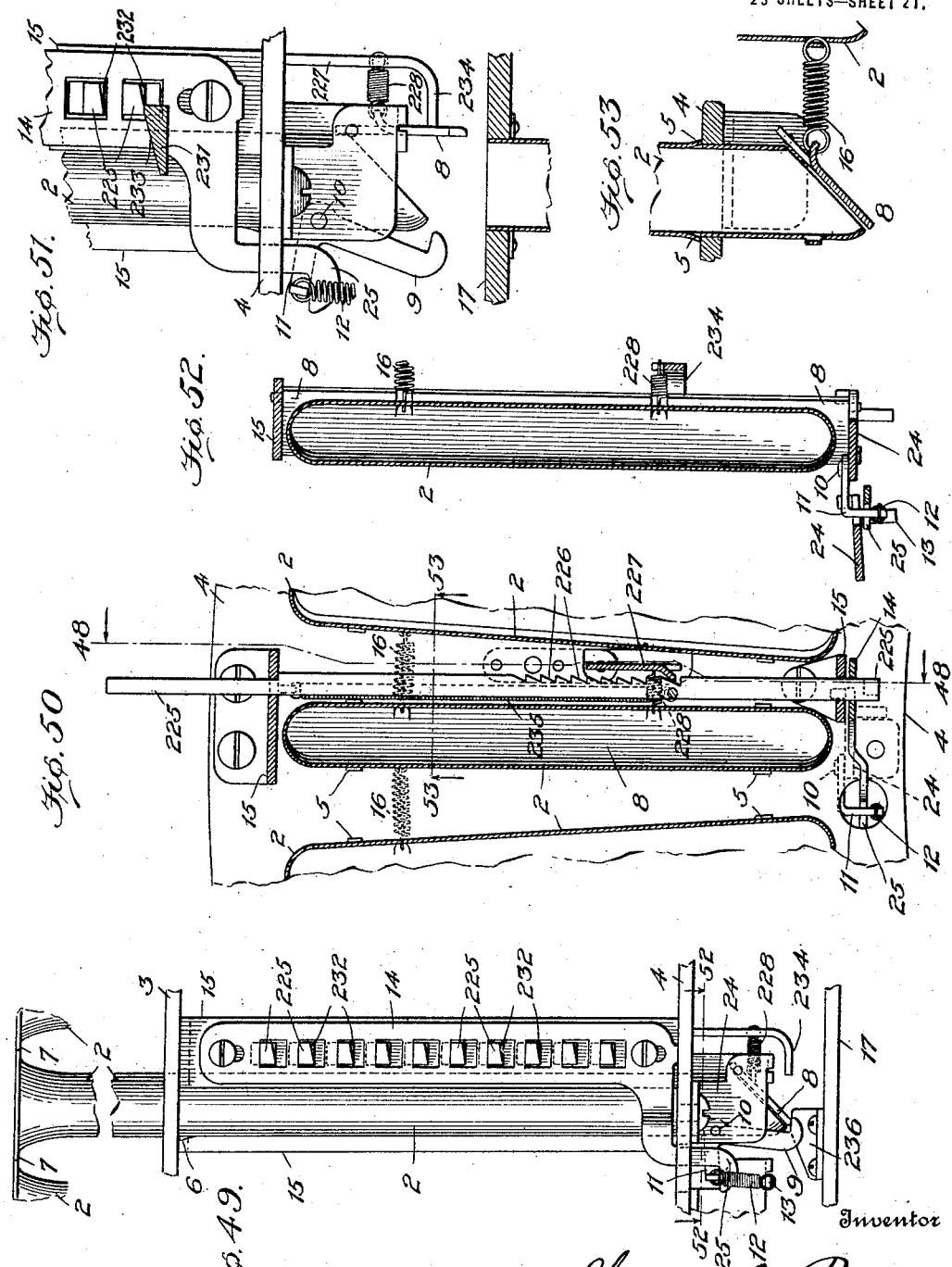

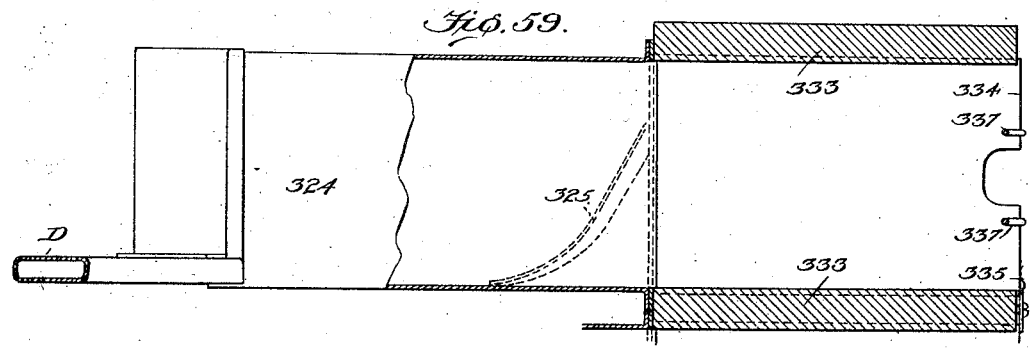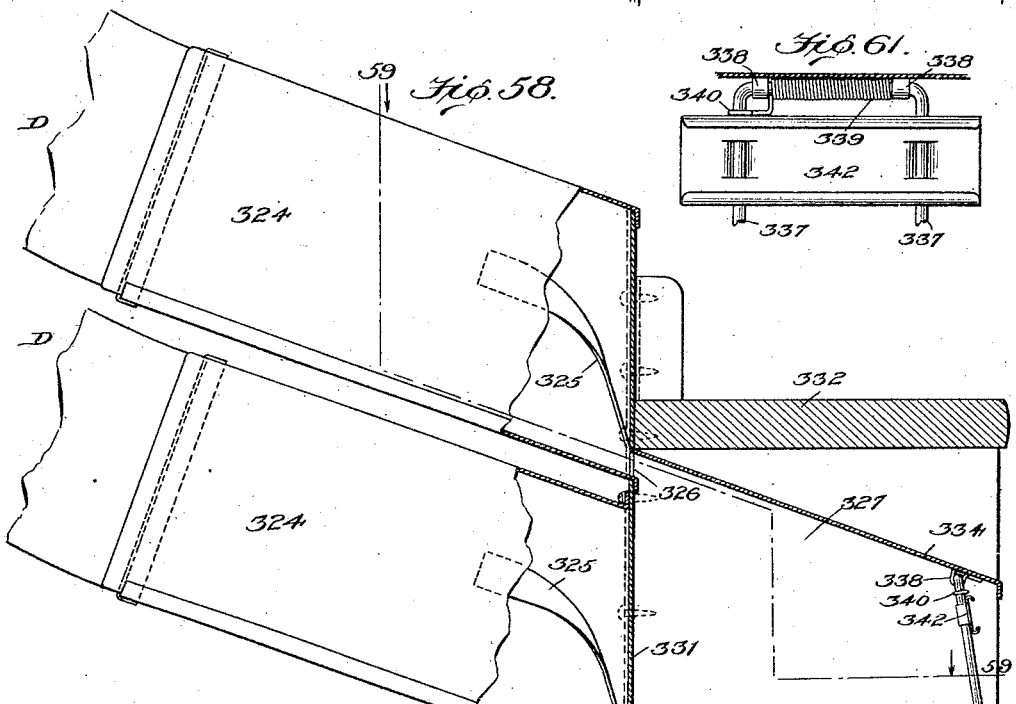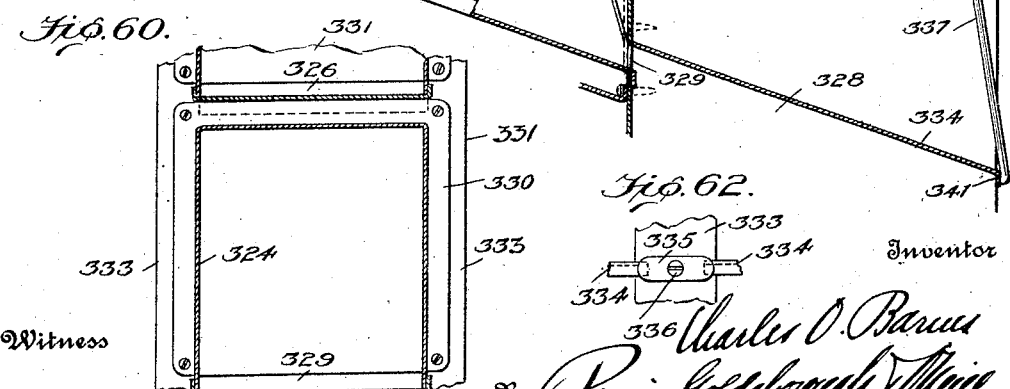

UNITED STATES PATENT OFFICE.

CHARLES O. BARNES, OF HAGERSTOWN, MARYLAND.

MAIL-DISTRIBUTING APPARATUS.

1,410,446.  Specification of Letters Patent.  Patented Mar. 21, 1922.

Application filed March 14, 1916. Serial No. 84,041.

*To all whom it may concern:*

Be it known that I, CHARLES O. BARNES, a citizen of the United States, residing at Hagerstown, county of Washington, and State of Maryland, have invented certain new and useful Improvements in Mail-Distributing Apparatus; and I do hereby declare the following to be a full, clear, and exact description of the invention, such as will enable others skilled in the art to which it appertains to make and use the same.

This invention relates to apparatus for distributing and classifying various articles, such as mail matter, and has for its object to provide an apparatus for this purpose having the novel features of construction and operation hereinafter described.

In its preferred form, the apparatus comprises a rotatable turret or carrier provided with a plurality of circularly arranged pockets or cells into each of which one letter or other article to be classified is adapted to be deposited. Automatic mechanism is provided for elevating the mail matter to a point above the level of the turret where the address on each letter is read by the operator and it is automatically deposited in one of the above-mentioned pockets or cells of the turret. The movements of each letter from the point of elevation above the turret to the cell or pocket in the turret are controlled by the operator from a key-board.

Under the turret there are provided a plurality of chutes leading to the pigeon-holes or boxes in which the letters are ultimately deposited, there being one chute and one pigeon-hole for each of the cells or pockets on the turret except four. As a cell or pocket in the turret registers with the proper chute for conveying the letter to its proper pigeon-hole, the bottom of the pocket is automatically tripped by mechanism which is set at the time the operator depresses a key on the key-board for depositing a letter in one of the turret pockets. This mechanism preferably comprises a vertical series of index pins mounted on the turret adjacent each of the pockets. As the operator depresses the proper key, a letter is delivered from its elevated position to which the operator reads its address to that pocket of the turret which lies under a chute for conducting the letter from its elevated position to the pocket. The same act of depressing the key on the key-board moves one of the series of index pins belonging to the pocket in which the letter is deposited a predetermined amount longitudinally of itself, thereby causing such pin to project from the turret such an amount that it will be acted upon by a projecting finger carried by a stationary part of the frame-work in such a manner as to trip the bottom of the pocket and allow the letter to be discharged through the chute which the pocket then overlies into its proper pigeon-hole. A plurality of such projecting fingers are arranged in a circular series on a stationary part of the framework adjacent the rotatable turret and are divided in sub-series, all of the fingers of one sub-series being of the same height but of different lengths, i. e., each finger of the sub-series projects radially towards the turret a greater distance than the preceding finger. Each sub-series of these fingers, however, is arranged at a different elevation from the adjacent sub-series, the different elevations of the sub-series of fingers corresponding to the respective elevations of the index pins on the turrets. By this mechanism, it is obvious that when one of the index pins is so set that it projects from the turret a predetermined distance, there will be one and only one finger which will act upon this index pin during the rotation of the turret. The finger to so act upon the index pin will be the one which lies in the sub-series having the same elevation as the index pin which has been set by the key-board and the one which projects radially towards the turret the proper distance to make contact with the set index pin. It will be understood, of course, that the index pin on the pocket which carries the letter is set in accordance with the address upon the letter, and as the same setting of the index pin will always cause discharge from the turret into the same pigeon-hole, it is obvious that all of those letters which should be conveyed to the same pigeon-hole may be so deposited there by depression of the same key on the key-board. Other keys on the key-board set the index pins so that the turret will discharge into other pigeon-holes, and, therefore, all letters containing the same city address, or all letters which should go by the same train route, may be deposited in the same pigeon-hole.

As the key is depressed on the key-board by the operator, the turret is moved a predetermined amount so that the motion of the turret is a step by step motion. Each movement of the turret brings an empty pocket in position to have a letter deposited therein, and at certain movements of the turret, one of the letters is discharged from the turret into the proper chute leading to the proper pigeon-hole. It is obvious that the letter, after being deposited in the pocket of the turret, may be carried any distance less than 360° with the turret before it is discharged into its pigeon-hole, as the finger for tripping the bottom of the pocket may be one of the fingers which are soon reached by the turret, or it may be one of the fingers which are not reached by the turret until the same has made nearly one complete revolution. In any event, it is obvious that the letter is discharged at some point during the rotation of the turret and all of the pockets are, therefore, empty when they come under the feed chute for delivering the letters to the turret.

Various other but more subsidiary features are provided, which will be hereinafter described.

The invention is illustrated in the accompanying drawings, in which the preferred form of the apparatus is disclosed. The apparatus shown in the drawings is designed especially for distributing mail matter, and for convenience only mail matter will be herein referred to as the articles handled by the apparatus, but it will be understood that with slight modifications, the apparatus may be used for distributing other articles.

In the drawings:—

Fig. 1 is a general plan view of the apparatus with most of the chutes leading from the turret to the pigeon-holes omitted for the sake of clearness, only two of such chutes being shown;

Fig. 2 is a front elevation of the apparatus shown in Fig. 1;

Fig. 3 is a side elevation of the apparatus shown in Fig. 1;

Fig. 4 is an enlarged broken side elevation of the upper portion of the elevator and the mechanism in the vicinity thereof;

Fig. 5 is a plan view of the actuating mechanism, certain parts thereof being shown in section;

Fig. 6 is a side elevation of the actuating mechanism shown in Fig. 5;

Fig. 7 is a transverse vertical section taken on the line 7—7 of Fig. 5;

Fig. 8 is a vertical section taken on the line 8—8 of Fig. 5, showing the pawl and ratchet mechanism for imparting the step by step movement to the turret;

Fig. 9 is a horizontal section taken on the line 9—9 of Fig. 8;

Fig. 10 is a vertical section taken on the line 10—10 of Fig. 9 showing the locking and releasing mechanism for the ratchet disclosed in Fig. 8;

Fig. 11 is a vertical section taken on the line 11—11 of Fig. 5, showing the clutch mechanism which is controlled from the key-board;

Fig. 12 is a view similar to Fig. 11, showing the clutch just after actuation from the key-board and showing the two parts of the clutch in clutched relation;

Fig. 13 is a horizontal section taken through the center of the clutch members shown in Fig. 11;

Fig. 14 is a side elevation of the clutch actuating means;

Fig. 15 is a side elevation of the key-board, a portion of the side of the casing being broken away to expose the interior mechanism;

Fig. 16 is a vertical section through the key-board taken on the line 16—16 of Fig. 15;

Fig. 17 is a horizontal section through a portion of the key-board taken on the line 17—17 of Fig. 16;

Fig. 18 is a side elevation of the portion of the key-board adjacent the turret showing the sliding bars associated with the key-board for setting the index pins on the turret;

Fig. 19 is a vertical section of a portion of the key-board taken on the line 19—19 of Fig. 16 showing a special key and the mechanism associated therewith for rendering the operation of the turret continuous until it has made one complete revolution;

Fig. 20 is a vertical section taken on the line 20—20 of Fig. 19.

Fig. 21 is a rear view of the construction shown in Fig. 19 looking towards the back wall of the key-board casing;

Fig. 22 is an enlarged broken detail view of the ratchet and pawl mechanism shown in Fig. 19;

Fig. 23 is a plan view, partly in section, of the structure shown in Fig. 22;

Fig. 24 is a vertical section taken through a portion of the key-board on the line 24—24 of Fig. 16 showing the "error-key" employed;

Fig. 25 is a vertical section taken through the head of one of the keys of the key-board showing its detail construction;

Fig. 26 is a side elevation of the mechanism located at the top of the elevator for actuating the same with either a step by step relatively slow motion, or a relatively fast steady motion;

Fig. 27 is an enlarged detail view of a portion of the mechanism shown in Fig. 26;

Fig. 28 is a vertical section taken on the line 28—28 of Fig. 26;

Fig. 29 is a broken vertical section through the ratchet and pawl mechanism shown in Fig. 28;

Fig. 30 is a horizontal section taken on the line 30—30 of Fig. 27;

Fig. 31 is a vertical section taken on the line 31—31 of Fig. 27;

Fig. 32 is a front elevation, partly in section, of the feed rolls employed for feeding the letters from the top of the elevator towards the turret;

Fig. 33 is a side elevation of the feed rolls shown in Fig. 32;

Fig. 34 is a vertical section taken on the line 34—34 of Fig. 32, showing the parts illustrated in Fig. 33 in the position which they assume when the friction roll for delivering the topmost letter from the pile is in its operative position;

Fig. 35 is a vertical section through the retaining strip employed for permitting only a single letter to pass between the feed rolls;

Fig. 36 is a detail front elevation, partly in section, showing the lower feed roll and its supporting structure;

Fig. 37 is a broken plan view of the toggle mechanism employed for moving the friction roll into operative engagement with the topmost letter of the pile;

Fig. 38 is a front elevation of the mechanism employed for bringing the letter to reading position in front of the operator;

Fig. 39 is a plan view of the structure shown in Fig. 38;

Fig. 40 is a vertical section taken on the line 40—40 of Fig. 38;

Fig. 41 is an end elevation of the structure shown in Fig. 38;

Fig. 42 is a vertical section taken on the line 42—42 of Fig. 41;

Fig. 43 is a vertical section taken through the center of the framework for holding the letters in their reading position and the mechanism employed for lifting the letters to the reading position;

Fig. 44 is a vertical section taken through the chute which leads from the structure shown in Fig. 38 to the turret;

Fig. 45 is a broken plan view, partly in section, of the portion of the turret adjacent the key-board, the supporting framework for the key-board being shown but the key-board removed for the sake of clearness;

Fig. 46 is a broken vertical section of a portion of the turret showing the supporting structure for the pockets and the supporting structure for the chutes leading from the pockets to the pigeon-holes;

Fig. 47 is a side elevation of one of the sub-series of fingers for engaging with the index pins;

Fig. 49 is an end view of one of the pockets of the turret looking radially towards the turret and showing the vertical series of index pins and the mechanism actuated thereby for tripping the bottom of the pocket;

Fig. 50 is a horizontal section taken on the line 50—50 of Fig. 48;

Fig. 51 is a detail end view of the lower portion of one of the pockets showing the bottom of the pocket just after it has been tripped by one of the fingers for engaging the index pins;

Fig. 52 is a horizontal section through the lower portion of one of the pockets taken on the line 52—52 of Fig. 49;

Fig. 53 is a vertical section taken through the lower portion of one of the pockets showing the spring employed which tends to open the bottom of the pocket when tripped;

Fig. 58 is a side elevation, partly in section, showing one of the pigeon-holes, a portion of an underlying pigeon-hole and two of the turning boxes employed for turning the letters just prior to their delivery to the pigeon-holes to insure their delivery in substantially a horizontal plane;

Fig. 59 is a horizontal section taken on the line 59—59 of Fig. 58;

Fig. 60 is a transverse section taken through one of the turning boxes just in front of where it is secured to the back wall of the pigeon-hole;

Fig. 61 is a detail view showing the manner in which a name-plate may be associated with each pigeon-hole; and Fig. 62 is a detail view showing the manner in which the bottoms and tops of the pigeon-holes may be mounted in the supporting casing.

Figure 48:
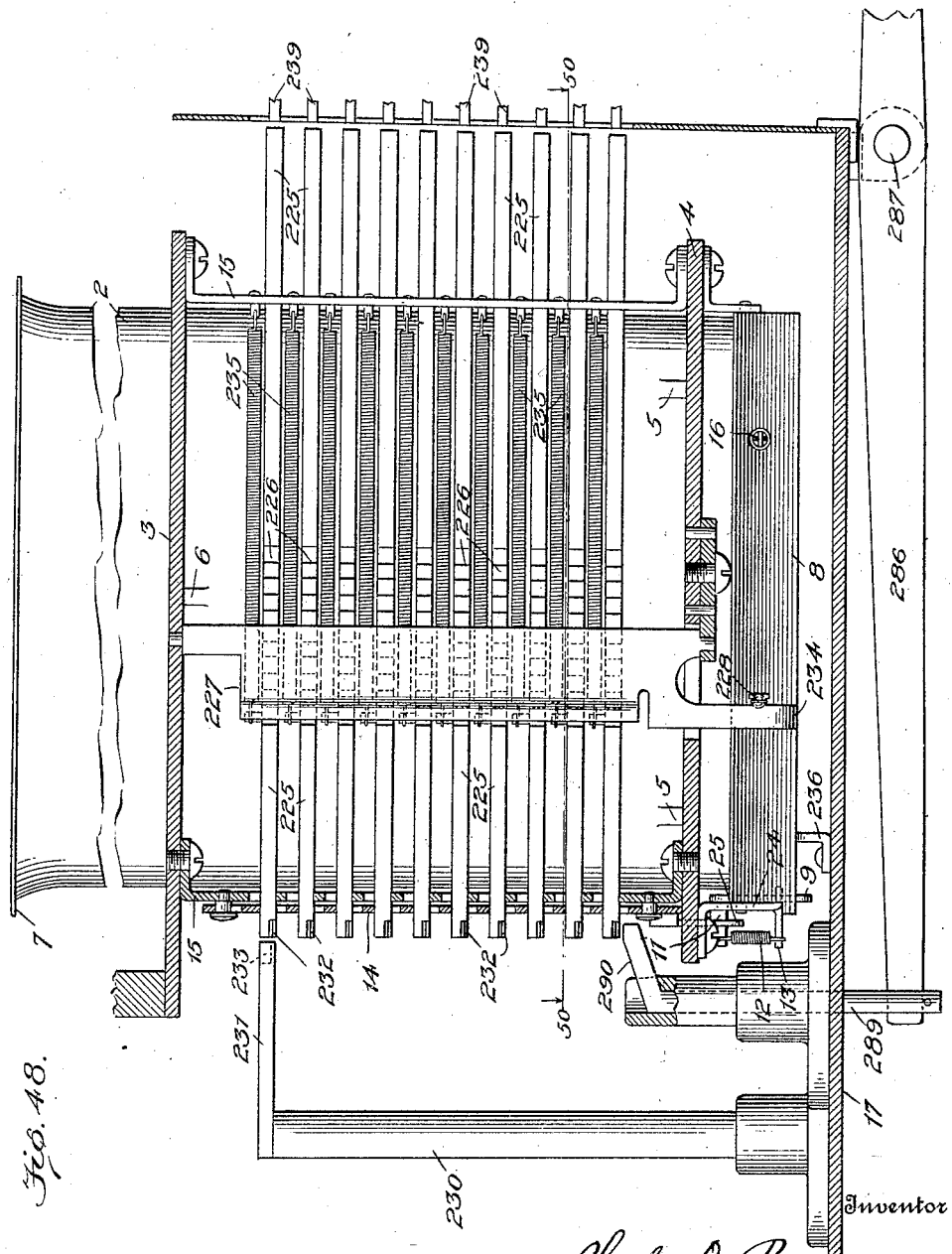
Fig. 48 is a vertical section taken through a portion of the turret adjacent one of the pockets, the section being taken on line 48—48 of Fig. 50.

In order to make the detail description of the apparatus more comprehensible, the main parts of the apparatus will first be generally described and the relation of each of the parts to the other parts will be specified.

Referring to the drawings, the apparatus comprises an elevator, denoted generally by the reference character A (Fig. 3), which elevates the letters to the mechanism B (Fig. 2) for feeding the topmost letter first to a position where the address on the letter may be read by the operator, and then to one of the pockets in the rotatable turret C. Two of the chutes above-mentioned for conducting the letters from the turret pockets to the pigeon-holes are shown at D and the series of pigeon-holes or boxes into which the letters are ultimately deposited are denoted generally by E. The movements of the letters to the turret and the movement of the turret are controlled from the keyboard F. The various movable parts of the machine comprising the turret, the elevator and the mechanism for conducting the letters from the elevator to the turret are operated from the actuating mechanism denoted generally by the reference character G.

The parts above generally referred to are so designed and related that upon the depression of one of the keys of the key-board, the topmost letter is fed from the pile of letters on the elevator into the mechanism B immediately in front of the operator. At the same time, one of the letters which has been so delivered to the mechanism B by the depression of a previous key is brought into reading position in front of the operator and the letter which has been previously brought to reading position by the depression of still another key is delivered to the turret C. Each time one of the keys of the key-board is depressed, the turret is moved one space to bring an empty pocket in operative relation with the mechanism B, and at certain movements of the turret one or more letters are discharged from the turret pockets through the chutes D, into the pigeon-holes or boxes E.

Each of the above-mentioned main parts of the apparatus has associated therewith certain co-operative mechanism designed to bring about the above results and the specific construction of the main parts of the apparatus in conjunction with such co-operative mechanism will now be described.

The turret C is provided with a plurality of pockets, best shown at 1 in Figs. 1 and 45. The number of such pockets will, of course, depend upon the size of the turret and the character of the co-operating mechanism. In the present instance, 100 of such pockets are shown. It is immaterial, so far as the broad aspects of the invention are concerned, how the pockets are formed in the turret, but preferably each pocket comprises a sheet-metal tube or container 2, best shown in Figs. 48 to 52, inclusive. Each of these tubes is inserted through openings provided in upper and lower plates 3 and 4, respectively, of the turret and is supported by and held in place with respect to these plates by the lugs 5 and 6 (Figs. 48 and 53) struck up from the metal of the tubes. The tubes project at their upper ends beyond the upper plate 3 and are provided with meeting flanges 7, so that all of said flanges in conjunction lying in a horizontal plane present a smooth surface at the top of the turret broken only by the openings in the tubes constituting the pockets 1. The lower end of each of the tubes 2 is provided with a hinged bottom or closure 8 (Figs. 49, 51 and 53) which is normally retained in its closed position by means of a catch device 9 pivoted at 10 to a depending bracket 24 secured to the under side of the lower plate 4. The catch device 9 is in the form of a bell-crank lever, the arm 11 of which is held downwardly by means of the spring 12 secured to said arm and to a projecting portion 13 of the adjacent bracket 24. The catch device 9 is tripped in the manner hereinafter more fully described by means of the vertically sliding plate 14 mounted to slide upon one of the supports 15 through which the index pins pass, as will hereinafter appear. The plate 14 is adapted to be lifted by any one of the index pins and when so lifted, a hook 25 associated therewith will trip the catch device 9 which will permit a spring 16 interposed between the hinged bottom of the pocket and the adjacent pocket (Fig. 53) to swing said bottom 8 to its open position.

The two plates 3 and 4 carrying the letter-receiving pockets rotate over a relatively stationary lower plate 17 which supports the chutes leading to the pigeon-holes. The said lower plate 17 is supported by means of the casting 18, which, in turn, is supported by the standard 19 passing downwardly to the floor where it is supported by the base structure 20. The upper and lower plates 3 and 4 of the turret are supported by means of the spider 21 which is rotated by means of the central shaft 22 passing downwardly through the standard 19 to a point where it is secured to a beveled gear 23. The beveled gear 23 is rotated from the actuating mechanism G.

Referring to Figs. 2, 3, and 5 to 14, inclusive, it will be seen that the actuating mechanism G comprises a main driving shaft 26 suitably journaled in the lower supporting structure of the apparatus. The driving shaft 26 may be rotated from any suitable source of power, such as the electric motor 27 capable of driving the shaft 26 through the intermediary of the belt 28 passing over the pulley 29 on the driving shaft and the pulley 30 associated with the motor. The driving shaft 26 is continuously rotated and at one end is provided with two pulleys 30 and 31 for operating the elevator mechanism and for rotating the feed rolls, in the manner hereinafter described. Near its other end the driving shaft 26 is provided with a pinion 32 for driving an auxiliary shaft through the intermediary of a beveled gear 33. The auxiliary shaft is composed of two portions, a driving portion which is continuously rotated from the shaft 26, and indicated at 34, and a driven portion indicated at 35. The driven portion 35 of the auxiliary shaft is rotated from the driving portion 34 only when two intervening clutch members, indicated at 36 and 37, are in clutched relation. The clutch comprising the clutch members 36 and 37 is controlled from the key-board in the manner hereinafter described, and causes the driven portion 35 of the auxiliary shaft to make one complete revolution, after which the clutch is automatically disengaged to arrest motion of the driven portion 35 of the auxiliary shaft.

The details of the clutch are shown in Figs. 11 to 14, inclusive, from which it will be noted that the member 37 has a central opening to receive the hub portion 38 of the member 36. The portion of the member 37 which encircles the hub portion 38 of the member 36 is provided with a series of semi-circular recesses 39. The member 36 has journaled therein a pawl 40 which is capable of slight rotary movements. The outer extremity of the pawl is reduced in diameter so that the lateral surface 41 of the reduced portion of the pawl will normally be flush with the outer surface of the hub portion 38. This lateral surface 41 of the pawl is rounded to conform to the arc of a circle, the radius of which is the same as the radius of the hub 38. Under these conditions, it will be seen that the extremital portion of the pawl 40 occupies a recess in the hub 38 and normally does not prevent rotation of the member 37, as the lateral surface 41 of the pawl normally lies flush with the outer surface of the hub portion 38, as best shown in Fig. 11. The pawl 40 is secured to a dog 42 which is normally held in its raised position by a trip lever 43. When the dog 32 is so held in its raised position, the pawl 41 occupies the position shown in Fig. 11, but a coil spring 44 interconnecting a pin 45 on the dog 42 and a pin 46 on the clutch member 36 tends to lower the dog 42 and swing the pawl 40 to the position shown in Fig. 12. This is normally prevented, however, by the trip lever 43 which engages under the dog 42. The trip lever 43 is operated through the intermediary of an arm 47 connected to a rod 48 passing upwardly to the key-board. When the rod 48 is raised by the depression of one of the keys of the key-board, in the manner to be hereinafter described, the trip lever 43 is shifted to the position shown in Fig. 12 and the spring 44 swings the pawl 40 to the position shown in Fig. 12. A portion of the pawl will then project radially from the hub portion 38 a greater distance than any other part of said hub portion, and such projecting portion of the pawl will be engaged by the oncoming semi-circular recess 39. When the pawl 40 is so engaged by one of the semi-circular recesses, the clutch member 37 carries the clutch member 36 with it until the clutch member 36 has made one complete revolution. In the meantime, the trip lever 43 has been restored to its normal position and when the dog 42 reaches its starting point after one complete revolution, it is again engaged and lifted by the trip lever 43, thereby swinging the pawl 40 to its normal position and permitting the clutch member 37 to rotate without affecting the clutch member 36. Each rotation of the driven portion 35 of the auxiliary shaft controls all the movements of the machine, except the rotation of the feed rolls and the movements of the elevator which are controlled from the pulleys 30 and 31, as above stated. The mechanism associated with the driven portion 35 of the auxiliary shaft for driving all the other parts of the apparatus, except the turret, will be described when the description of such parts is reached. At present only the manner in which the turret is driven from the shaft 35 will be considered. For this purpose, the driven portion 35 of the auxiliary shaft has keyed thereto a cam 49 for imparting reciprocating motion to a pawl which, in turn, actuates a ratchet 50 secured to a shaft 51 carrying a pinion 52 meshing directly with the beveled gear 23 secured to the turret shaft.

The mechanism interposed between the cam 49 and the ratchet 50 for operating the latter comprises a cam roller 53 secured to the sliding member 54 mounted to reciprocate in the guideways 55 formed in a suitable casting. The sliding member 54 is provided with a central bore in which is adapted to telescope the end of a rod 56. The other end of the rod has secured thereto a second sliding member or slide block 57 between which and the reciprocating member 54, a coil spring 58 is interposed. The extremity of the rod 56 which is adapted to slide in the member 54 is guided in the latter by means of a pin 59 passing through the rod and having extremital portions engaging in the slots 60 formed in the sides of the reciprocating member 54.

When the reciprocating member 54 is actuated through the intermediary of the cam roller 53 and cam 49, the spring 58 is capable of moving the slide block 57 without any telescoping action taking place between the member 54 and the extremity of the rod. This yielding connection is merely provided for safety and will not yield under normal conditions. The roller 53 is retained in engagement with the cam 49 by means of a second coil spring 61 secured to a pin 62 projecting from the slide block 57 and to a pin 63 set in a stationary part of the casting.

The slide block 57 carries the pawl for operating the ratchet 50. The pawl is shown at 64.

Means is preferably provided for locking the ratchet in place after each actuation thereof, and this means may take the form of a lock wheel 65 secured to the same shaft as ratchet 50 and provided with a plurality of teeth formed somewhat in the same manner as gear teeth. Pivotally mounted upon the casting which supports all of the mechanism now being described is an arm 66 carrying at its extremity a tooth or projection 68. When the arm 66 is in its lowermost position, the tooth 68 engages in one of the notches between the teeth of the lock wheel 65, thus holding the lock wheel, and hence the ratchet 50 stationary upon the return stroke of the pawl 64. Obviously means must be provided for lifting the tooth 68 before the ratchet can be actuated by the pawl 64, and this means may comprise a cam lever 69, best shown in Fig. 10, pivoted in the slide block 57. During the return stroke of the pawl 64, the pawl is moved a greater distance than is actually necessary for engagement with the next tooth of the ratchet and during the subsequent forward movement of the pawl and while this play is being taken up, a cam surface 70 formed on the cam lever 69 engages under a roller 71 carried by an arm 72 secured to the same stub shaft 73 as the arm 66. When the roller arm 72 is raised, it is, therefore, obvious that the arm 66 is also raised to permit actuation of the ratchet by the pawl 64. The cam surface 70 on the pivoted cam lever 69 is formed on an angular offset portion shown at 74 in Fig. 9 and during the forward movement of the pawl, the roller 71 rides up the incline 70 and then drops back in place after the inclined surface has passed completely under the roller 71. This return movement of the roller 71 is effected by means of a coil spring 75 interposed between the arm 72 and a stationary part of the casting. It is obvious that when the roller 71 and tooth 68 return to their normal position after being acted upon by the inclined surface 70, the tooth 68 will engage in the next notch of the lock wheel, as the ratchet and lock wheel have been moved one space while the arms 72 and 66 are held raised. During the return stroke of the pawl 64 and cam 69, the roller 71 passes under the angular projection 74 of the cam lever 69. In other words, the cam lever 69 merely rides over the roller 71 and is slightly lifted against the tension of a spring 76 which serves to retain the cam lever 69 in the position shown in Fig. 10. By the mechanism so far described, it will be obvious that each time the clutch members 36 and 37 are engaged from the keyboard, the pawl and ratchet mechanism just described will rotate the turret one space which should be a distance sufficient to bring an empty pocket under the chute for discharging the letters into the turret pockets.

The turret is preferably elevated as shown in Figs. 2 and 3 to permit delivery of the letters through the various chutes by gravity. As it is desirable to have the key-board F located immediately adjacent to the turret C, it is, therefore, necessary that the operator be stationed upon an elevated platform, indicated at 77, which may be reached by a series of steps 78. The operator stationed upon the platform 77 is in position to operate the key-board F and also to read the addresses on the letters which successively appear before him in the reading frame 79 (Fig. 2). The mechanism by which the letters are elevated, passed through the reading frame 79 and discharged into the turret, will now be described.

Figure 54:
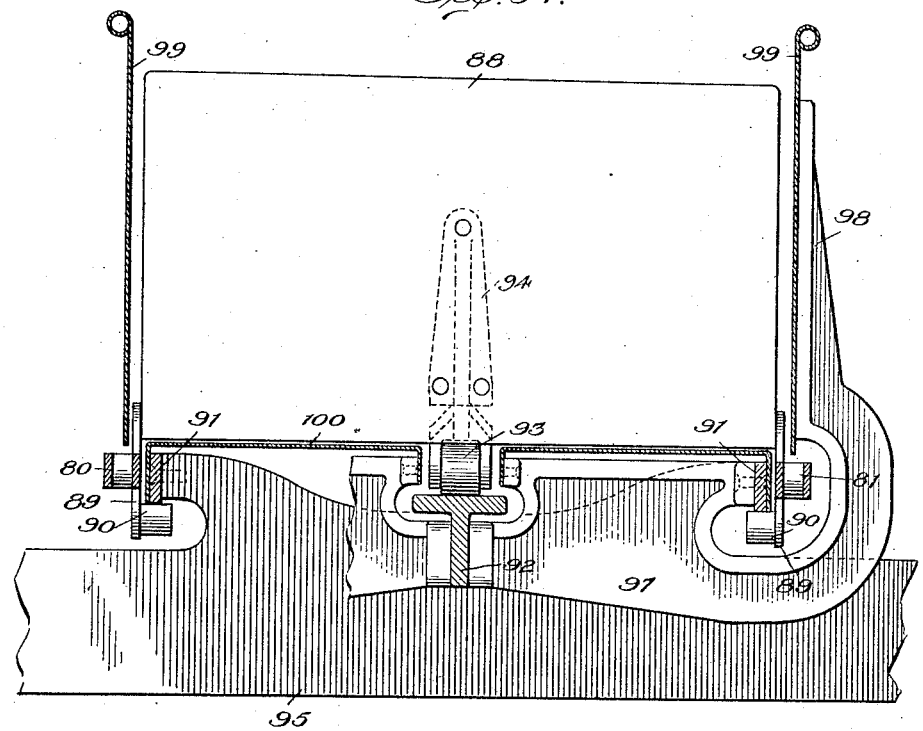
Fig. 54 is a horizontal section taken on the line 54—54 of Fig. 3 showing the under side of one of the elevator shelves and the casting for supporting the elevator structure.
Figure 55:
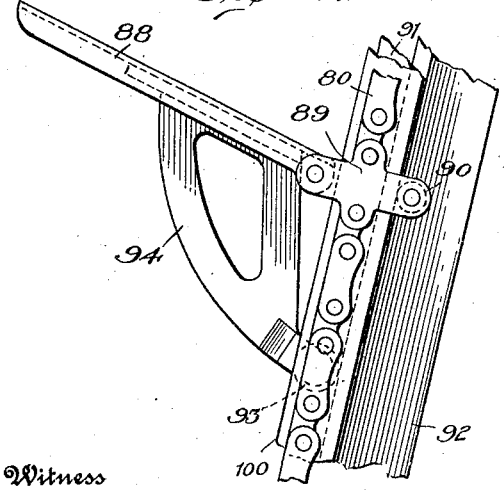
Fig. 55 is a detail broken side elevation showing the construction of the elevator shelves and the manner in which they are supported on the elevator trackways.

Referring particularly to Figs. 2 and 3, it will be noted that two elevator chains are provided, shown at 80 and 81. The lower portions of the chains pass over lower sprockets 82 and 83 rotatably mounted in an arm 84 projecting from the standard 85 which serves to support the operating mechanism for the elevator, as will hereinafter appear. The chains 80 and 81 at their upper ends pass over sprockets 86 and 87, respectively. The shelves for supporting the piles of letters are indicated at 88 and are attached to the elevator chains in the manner best shown in Figs. 54 and 55. Adjacent each of the shelves 88, the chains are provided with specially constructed links 89 to which the shelves are pivoted at one side and at the other side, said special links carry rollers 90 riding upon the rear side of a track bar 91. It will be understood that the shelves 88 extend the full width of the elevator, as shown in Fig. 54, and that one of the track bars 91 is provided at each side of the elevator. Positioned between the two track bars 91 at the rear of the elevator is a third track bar 92, the cross section of which is substantially T-shaped, as shown in Fig. 54. A roller 93 carried by a depending bracket 94 on each of the shelves rides upon the front face of the track bar 92. It is obvious that the rollers 90 and the roller 93 on each shelf engaging behind the track bars 91 and riding on the front of the track bar 92, respectively, hold the shelves in the position shown in the drawings, while they are being elevated by the chains.

The track bars 91 and 92 are supported at their lower ends by the extremital portion of the projecting arm 84, such extremital portion being shown at 95 in Fig. 54. The upper ends of the track bars 91 and 92 are supported in a similar manner by the upper projecting portion 96 of the standard 85.

At various points throughout the length of the track bars 91 and 92, brackets 97 are provided which are secured to the track bars and are provided with forwardly projecting portions 98 capable of supporting side plates 99 forming the side walls of a casing for the elevator. The rear wall of the casing is shown at 100 (Fig. 54) and is formed by sheet-metal plates secured to the brackets 97.

The topmost shelf 88 of the elevator will normally engage a trip roller 101, best shown in Figs. 26 and 28, and when this trip roller is held in its raised position, the actuating mechanism for the elevator will be tripped and thrown out of operation, but as soon as the pressure on the trip roller 101 is relieved, the actuating mechanism to be presently described operates the elevator to bring the pile of letters upon the next lower shelf into engagement with the trip roller 101.

Figure 56:
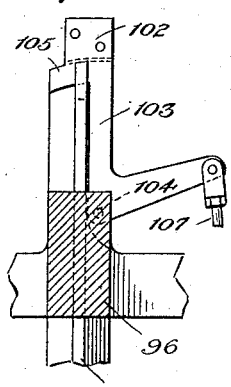
Fig. 56 is a rear elevation of the extreme upper end of the trackway showing the movable portion associated therewith for permitting lowering of the elevator shelves.
Figure 57:
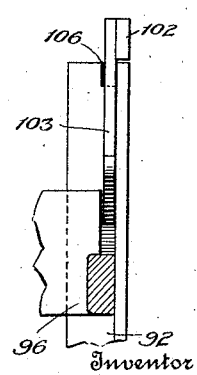
Fig. 57 is a side elevation of the structure shown in Fig. 56.

The letters to be fed to the turret are placed upon the shelves 88 of the elevator, and in order to bring the topmost letter into engagement with the roller 101, it is obvious that the empty shelf which is at that time in engagement with the roller 101 and thereby holding the actuating mechanism in tripped condition, must be removed. This is accomplished as follows. When the topmost empty shelf is in engagement with the trip roller 101, the roller 93 associated with such shelf rests upon the extreme upper end of the track bar 92. This extreme upper end is shown at 102 in Figs. 56 and 57 and is made movable so that it can be withdrawn from supporting relation with the roller 93, thus permitting the shelf to drop to a substantially vertical position. As shown in Figs. 56 and 57, the movable portion of the track bar 92 is shifted by means of a bell-crank lever 103 pivoted at 104 to the back of the front flange of the track. The bell-crank lever 103 is provided with a projecting portion 105 which engages in a recess 106 formed in the top of the rearwardly projecting flange of the track merely for the purpose of guiding the bell-crank lever. The extreme upper end of the bell-crank lever 103 has secured thereto the above-mentioned movable portion of the track 102, the outer surface of which is substantially flush with the outer surface of the main portion of the track. The bell-crank lever 103 is connected by means of a link 107 to an actuating handle 108 positioned within easy reach of the operator. It is obvious that when the handle 108 is actuated, the bell-crank lever 103 may be shifted to move the portion 102 of the track from behind the roller 93 of the topmost shelf, thereby permitting the shelf to drop. When the shelf drops in this manner, it relieves the pressure upon the trip roller 101, thereby permitting said roller to drop to its extreme lowermost position. The lowering of the trip roller 101 swings an arm 109 (Fig. 26) to the left in the drawing, thus throwing a clutch member 110 into engagement with the clutch member 111. The clutch member 110 is keyed to a shaft 112 on which the upper elevator sprockets are secured, while the clutch member 111 is loose on shaft 112 and is continuously rotated by a worm wheel 113 to which it is secured. The worm wheel 113 is actuated from a worm 114 secured to a shaft 115 (Fig. 28) driven from the pulley 116. The pulley 116 is connected by means of a belt 117 with the hereinbefore-mentioned continuously rotating pulley 30 of the actuating mechanism G. When the clutch members 110 and 111 are in engagement, it is obvious that the sprockets 86 will be driven directly by means of the worm and worm wheel 114—113 at a relatively fast speed to bring the pile of letters on the next lower shelf into engagement with the trip roller 101.

The trip roller 101 will not be shifted to its extreme raised position by the letters until the pile of letters is partially compressed under the trip roller. When the roller is first engaged by the letters, however, the clutch mechanism 110 and 111 is thrown out, but a slow step by step upward motion is still imparted to the elevator by means of a plurality of cams 117′ formed on the side of the worm wheel 113, which cams act upon one arm 115′ of the bell-crank lever. The other arm 116 of the bell-crank lever acts upon the lower end of a vertically reciprocating slide bar 117 (see particularly Figs. 26 and 28). Each time one of the cams 117′ actuates the arm 115′, the slide bar 117 is raised and through the intermediary of the pawl 118 serves to rotate a ratchet 119 one space. A retaining pawl 120 pivoted to a stationary part of the framework retains the ratchet in its newly assumed position each time the ratchet is actuated. As will be seen from Fig. 26, the ratchet 119 is loosely mounted upon the shaft 112 on which the upper elevator sprockets are secured, and, serves to drive the sprocket 86, shaft 112, and elevator with a step by step movement through coiled cushion springs 112′ interposed between lugs 86′ on the adjacent sprocket 86 and lugs 119′ on the ratchet 119. This step by step motion of the elevator continues until the trip roller 101 is moved to its extreme raised position, at which time an arm 121 (Figs. 26 and 27) has moved a sufficient distance to the right to permit a catch device 122 to hold the slide bar 117 in its raised position. The catch device 122 comprises a slide which carries an adjustable contact screw 123 with which the arm 121 contacts. The catch device is spring-held towards the slide bar 117 by a spring 124. When the arm 121 is retracted so that the catch device 122 is allowed to move to the right, the extremity of the catch device engages in a notch 125 formed in the slide bar 117, and, therefore, retains the slide bar in its raised position. It will, therefore, not follow the movement of the oscillating arm 116 and hence, the feed movement of the elevator through the ratchet 119 will cease. As each letter is fed from the top of the pile, the resulting decrease in pressure upon the trip roller 101 will allow the same to drop sufficiently to move the catch device 122 out of engagement with the notch 125, thus allowing oscillating arm 116 to reciprocate the slide bar 117 and move the elevator through the intermediary of the ratchet one or more steps until the next letter on the pile again trips the actuating mechanism, in the manner just described. By this mechanism, the letters are automatically elevated to their proper position and the topmost letter will always be in contact with the roller 101, and in readiness to be fed from the pile of letters by the feed rollers to be hereinafter described. Each time the topmost letter is fed from the pile, the pile of letters is moved up until the next letter is in position to be fed from the pile. The gradual upward feed of the pile of letters by means of the ratchet 119 is, therefore, for the purpose of compensating for the reduction in height of the pile of letters each time one is fed from the pile, while the direct and rapid drive of the elevator through the clutch members 110 and 111 is for the purpose of bringing a pile of letters rapidly into contact with the roller 101 when the pile is first placed upon a lower shelf and a space intervenes between the topmost letter and the trip roller. Obviously the slow step by step movement would consume too much time to bring the top letter into contact with the trip roller, and, therefore, the quick action mechanism just described is provided.

The topmost letter of the pile normally contacts with two anti-friction rollers 126 and 127 (Figs. 32, 33 and 34) journaled in the top plate 128 of the elevator. Positioned above the plate 128, but capable of coming in contact with the topmost letter, are two friction wheels or rollers which constitute in effect a single friction roller which has been hereinbefore referred to for feeding the topmost letter from the pile. The two friction rollers are shown at 129 and 130 and are rotatably mounted upon a transverse shaft 131 secured at one end in a swinging bracket frame 132, and at its other end secured to an arm 133, which, in turn, is secured to an intermediate shaft 134. That end of the shaft 134 which is adjacent the swinging bracket 132 is journaled in said bracket so that both of the shafts 131 and 134 will swing with the bracket 132 when the latter is actuated. The shaft 134 carries two friction rollers 135 and 136 for driving the rollers 130 and 129, respectively. The friction rollers 135 and 136 are in turn driven from the topmost roller of a pair of feed rollers, shown at 137 and 138, which grip the latter after it has been fed from the pile by the friction rollers 129 and 130 and feed the same to the reading frame. The feed rollers 137 and 138 are journaled in the casting 139 which is bolted by means of the bolts 140 to a bracket 141 serving to support all of the friction rollers from the standard 85.

The swinging bracket 132 is pivotally mounted to swing about the axis of the top feed roller 137, as shown at 142 so that in all positions of the swinging frame 132, the friction rollers 129 and 130 will be driven frictionally from the topmost feed roller 137 through the intermediary of the intervening friction rollers 135 and 136.

An upstanding portion 143 of the swinging bracket 132 is connected to an upstanding portion 144 of the casting 139 by means of toggle levers shown at 145 and 146. A coil spring 147 serves to connect the upstanding portion 143 with a projection 151 on the toggle lever 146 and tends to break the toggle, as shown in Fig. 33, and to hold the friction rollers 129 and 130 out of contact with the topmost letter. The toggle lever 146 is secured to a transverse shaft 148 to which is also secured an arm 149 connected by means of a link 150 to the mechanism hereinafter described for moving the friction rollers 129 and 130 into contact with the topmost letter. When the link 150 is moved longitudinally to the left in the drawing, the toggle levers 145 and 146 are shifted to the position shown in Fig. 34 and the swinging frame 132 is lowered to the position shown in Fig. 34, so that the friction rollers 129 and 130 will come in contact with the topmost letter.

When the toggle is straightened as shown in Fig. 34, a shoulder 152 associated with the toggle lever 145 engages behind a shoulder 153 of a pivoted catch lever 154, and, therefore, the toggle levers are held in the position shown in Fig. 34 and the friction rollers held in contact with the topmost letter until the front portion of the letter passes under a trip lever 155. The trip lever 155 is lifted by means of the letter passing thereunder and through the intermediary of the links 156 and 157 serves to retract the catch lever 154 against the tension of a spring 158, thereby permitting the spring 147 to break the toggle and raise the friction rollers 129 and 130 from engagement with the topmost letter.

The lower feed roller 138 is carried by a shaft 159, the extremities of which are supported in a yoke 160. The extremities of the yoke are slidably mounted in the vertical guideways 161 and 162, so that the lower feed roller and the yoke are capable of slight vertical movements. The lower feed roller is yieldingly held in contact with the upper feed roller by means of the coil springs 163 and 164 connected at their lower ends to the yoke and at their upper ends to pins 165 and 166 formed on a stationary part of the framework.

The lower feed roller is provided with a circumferential recess 167 to accommodate a sheet-metal guard 168 secured at its lower end to the yoke. The upper portion of the guard is bent as shown at 169 and this angular bend in the guard is the only portion thereof which projects beyond the surface of the roller. The purpose of the guard is to provide a substantially horizontal portion 170 over which the letters are caused to pass and which prevent the letter from following the lower roll. In other words, the guard directs the letters through a discharge opening or tube 171 and the horizontal portion 170 of the guard 168 is bifurcated to accommodate the end of the trip lever 155, as clearly shown in Fig. 34.

A flexible strip of suitable material, such as rubber, leather or the like, shown at 172, serves to retain the lowermost letters of the pile while the topmost letter is being delivered to the feed rollers. The retaining strip 172 may be secured to a transverse portion 173 of the framework by means of a clamping strip or plate 174 clamped against the framework by means of the studs 175. A piece of wire 176 may be passed through openings in all of the studs 175 to retain them in place, as best shown in Fig. 32. The clamping plate 174 is provided with a recess 177 to receive and clamp the edge portion of the retaining strip 172. Motion is transmitted to all of the friction rollers by means of the belt 178 passing over a pulley 179 at one end of the top feed roller 137 and running downwardly to the pulley 31 associated with the actuating mechanism G.

It will, therefore, be apparent that when the friction rollers 129 and 130 are lowered so that they contact with the topmost letter of the pile, they will feed the topmost letter forwardly between the feed rolls 137 and 138. Before the letter has passed from under the friction rollers 129 and 130, the trip lever 155 has been raised by the front portion of the letter, thus permitting the spring 147 to break the toggle 145—146 and lift the friction rollers 129 and 130, so that they will not act upon the next lower letter. The feed rollers 137 and 138, however, have obtained a grip upon the forward portion of the letter and it is, therefore, fed through the tube 171 into the reading frame. The letter being fed to the feed rollers 137 and 138 passes over the top edge of the retaining strip 172, but the other letters are retained upon the elevator by the retaining strip, and, therefore, only one letter at a time is fed between the feed rollers. After the trip lever 155 is raised by the letter, it is desirable to lift the lever still farther so that it will not retard the movement of the letter, due to the weight of the lever resting on the letter. This is accomplished by providing a curved cam surface 180 on the upper portion of the catch lever 154 so that when said catch lever is tripped and the toggle is broken, the extremity of the shoulder 152 on the toggle lever 145 will ride upon the curved cam surface 180 and serve to force the catch lever 154 backwardly farther than would be the case if this cam surface were not provided. This action is clearly illustrated in Fig. 33, from which it will be noted that the catch lever 154 is not only moved a slight distance by the movement of the trip lever 155, but is forced back an additional amount by the extremity of the shoulder 152 to raise the trip lever 155 clear of the letter that is being fed. The trip lever 155 is again lowered to its operative position when the toggle is straightened and the friction rollers 129 and 130 brought into contact with the topmost letter.

The letters are fed by means of the feed rollers 137 and 138 to the reading frame. This is accomplished by discharging the letters from the feed rollers 137 and 138 on to a trough-like plate 181 (see particularly Figs. 40, 41 and 43). It will be noted that the letters on the elevator do not occupy a true horizontal position, but are inclined upwardly from the back of the elevator towards the front. This necessitates inclining the feed rollers and the other friction rollers above described, as shown in Figs. 32 and 40, so that they will conform to the inclination of the letters on the elevator. For this reason, the trough-like plate 181 into which the letters are discharged from the feed rollers is also inclined in its normal position an amount equal to the inclination of the feed rollers. The plate 181 is pivoted at its lower edge, as indicated at 182, to two brackets 183 and 184, said brackets being secured to the back of the key-board, as indicated at 185 in Fig. 3, and also secured to the casting which supports the key-board, as indicated at 186 in Fig. 3. The letter is fed to the plate 181, then lifted to nearly a vertical position to enable the operator to read the address upon the same, and is then subsequently removed from this position and deposited in one of the pockets on the turret. This is accomplished as follows. Referring particularly to Fig. 41, it will be seen that the lower portion of the plate 181 has secured thereto a web-like casting 187 to which is pivoted at 188, the lower end of a vertically reciprocating link 189. The link 189 is guided at its lower end in a guide-plate 190 and is pivoted at its upper end to a rocker-arm 191. A coil spring 192 tends to hold the link 189 in its lowermost position and, therefore, the plate 181 normally occupies the position shown in Fig. 41. A roller or pin 193 provided on the link 189 is actuated by means of a cam 194' to reciprocate the link 189 for the purpose of swinging the plate 181 to and from the dotted line position shown in Fig. 43. Just after the plate 181 assumes the position shown in dotted lines in Fig. 43, a plurality of fingers 194 pass from the full line position shown in Fig. 43 through slots or openings 195 formed in the plate 181 to move the letter on the plate forward and support the same while the plate 181 returns to its normal position. To accomplish this, the fingers 194 are secured to a transverse rock shaft 196 to which is secured a rock arm 197 (Fig. 41). The rock arm 197 is pivotally connected by means of a link 198 to a second rock arm pivotally associated with the bracket 184. A coil spring 200 acting upon the link 198 serves to yieldingly hold the spring fingers in the position shown in Fig. 41, but a cam 201 secured to the same shaft on which the cam 194' is secured acts upon a roller 202 on the link 198 and retracts the fingers to the full line position shown in Fig. 43, then subsequently allows the same to return to their normal position. In so doing, they pass through the slots in the plate 181 and shift the letter to nearly a vertical position while the plate 181 returns to its receiving position, it being understood that before the fingers 194 start moving forwardly, the plate on which the letter is supported has reached or nearly reached the dotted line position shown in Fig. 43.

The letter when so moved by the fingers 194 is brought directly behind a frame 203 in which is positioned a piece of glass or other transparent material 204 through which the addresses on the letters may be viewed by the operator. When the letters are delivered to the plate 181, they are supported at their lower edge by means of a plurality of sheet-metal stops 205 projecting above the lower edge of the plate 181. As will be clear from Fig. 43, when the plate 181 is raised, the lower edge of the letter rides up over the stops 205 and then the lower edge of the letter falls into a pocket 206 formed by the stops.

The cams 194 and 201 for actuating the plate 181 and the fingers 194 are carried by a shaft 207 journaled in the bracket 184 and rotated by means of the beveled gears 208 and 209 shown in Fig. 3. The beveled gear 208 is secured to the shaft 207 and the beveled gear 209 is secured to an actuating shaft which passes downwardly through a casing 210 to the actuating mechanism G. Referring to the drawing of the actuating mechanism in Figs. 5 and 6, it will be seen that the lower end of the shaft passing through the casing 210 is provided with a beveled gear 211 which is driven by a beveled gear 212 secured to the actuating shaft 35. Each time the shaft 35 is caused to make one revolution by the depression of any key on the key-board, as above described, the plate 181 and the fingers 194 are actuated in the manner just described to lift a letter to the reading position in back of the glass 204.

The letter is removed from its reading position by means of a kicking or striking device 213 (Figs. 38 to 41, inclusive), pivotally mounted upon a stationary bracket, as indicated at 214. The movement of the kicking or striking lever 213 is controlled by means of a cam 215 secured to the extremity of the shaft 207. A link 216 pivotally connects one end of the kicking or striking lever 213 with a rock arm 217 pivotally associated at its lower end with the bracket 184, as indicated at 218. A pin or roller 219 carried by the rocker arm 217 is held against the cam 215 by a coil spring 220 acting upon the link 216. When the depression 221 of the cam comes under the roller or pin 219, it is, therefore, obvious that the spring will draw the link 216 to the left in the drawing and swing the extremity of the kicking or striking lever to the right. The depression 221 in the cam is such that this motion will be very rapid and the letter will, therefore, be quickly thrown from its reading position through a chute 222 into one of the pockets of the turret. As the cam 215 for operating this kicking device is secured to the same shaft as the cams 194 and 201 for operating the plate 181 and lifting fingers 194, it is obvious that a letter will be removed from its reading position by the kicking device 213 each time any key on the key-board is depressed.

Secured to the face of the cam 215 is a cam 222' for acting upon a pin or roller 223 carried by the link 150 above referred to for moving the friction rollers in contact with the topmost letter by straightening the toggle 145—146. This link 150 is pivoted at its rear end to the rocker arm 224. The feeding of the topmost letter from the pile, the lifting of a letter to its reading position and the removal of a letter from its reading position are, therefore, effected from the shaft 207 which makes one revolution each time any key of the key-board is depressed, it being understood that after the machine is in operation there is always a letter to be fed from the pile on the elevator, a letter resting on the plate 181 ready to be lifted to its reading position, and a third letter in reading position ready to be discharged by the kicking device 213 into one of the pockets of the turret.

After the operator reads the address upon the letter through the glass 204, he depresses the proper key on the key-board for setting the index pins adjacent the pocket into which the letter is discharged, so that the bottom of the pocket will be tripped when the same reaches the proper chute leading to the proper pigeon-hole. This is accomplished in the following manner. Each of the pockets on the turret has positioned adjacent thereto a vertically arranged series of longitudinally sliding index pins shown at 225 in Figs. 45 and 48 to 51, inclusive. These pins are mounted to slide longitudinally in the brackets 15 hereinbefore described positioned between the turret plates 3 and 4. Each of the index pins is capable of being moved radially towards the center of the turret to occupy any one of ten positions. When any one of the index pins is so moved, its inner extremity will project beyond the other index pins a distance equal to the amount which the index pin has been moved. The index pins are moved in this manner from the key-board, as will hereinafter appear, and are retained in their shifted position by means of the ratchet teeth 226 formed upon each of the index pins and an elongated pawl 227 pivotally mounted in the upper and lower plates 3 and 4 and having an edge portion adapted to engage with the ratchet teeth 226. When any one of the index pins 225 is moved longitudinally from the key-board, as hereinafter described, the pawl 277 will retain the pin in its shifted position. If the index pin is moved one space from the key-board, the pawl will engage with the second tooth on the shifted index pin. If the index pin is moved three or four spaces, the pawl will engage with the third or fourth tooth on the index pin and so on. When any index pin is projected its maximum distance, the pawl will engage in the last tooth on such pin. It is, therefore, obvious that each of the index pins may be moved longitudinally of itself until it projects beyond the other index pins any one of ten predetermined distances. The pawl 227 is spring-held towards the ratchet teeth 226 by means of a spring 228 connected to the pawl and to the bottom of the adjacent cell or pocket.

The trip fingers for making contact with the projected index pins are arranged in a circular series at the inner side of the circular series of turret pockets. A portion of the series of these trip fingers is shown in plan view in Fig. 45, the trip fingers being indicated at 229. It will be noted that the series of trip fingers is arranged in sub-series, each of which comprises ten fingers, except certain of the sub-series from which some of the fingers are omitted for the purpose hereinafter described. The trip fingers comprise an upstanding shank portion 230, as shown in Fig. 48, and a horizontally or radially projecting portion 231. As will be noted from Fig. 45, the radially projecting portions 231 of the fingers vary in length in each sub-series, i. e., each sub-series contains ten fingers of different lengths, the first finger of the sub-series being the shortest and the last of the sub-series the longest. The fingers of each sub-series successively increase in length from the shortest trip finger to the longest. All the sub-series of the trip fingers are of different elevations corresponding to the elevations of the index pins. In other words, all of the fingers of one sub-series will correspond in elevation to the elevation of one of the index fingers. If several of the trip fingers were not omitted for the purpose hereinafter stated, there would be one hundred of such trip fingers, one for each pocket of the turret. The fingers are divided into ten sub-series with ten fingers in each sub-series. When the turret is provided with one hundred pockets and there are provided one hundred trip fingers for tripping the bottoms of the pockets, there must be ten index pins for each pocket, each of which is capable of being projected towards the trip fingers any one of ten distances. By this construction, it is obvious that if any one of the index pins be projected from its normal position, a predetermined distance during the rotation of the turret, the projected index pin will contact with one and only one trip finger of the entire series. This trip finger will be the one which lies in the sub-series having the same elevation as the projected index finger and which is of the proper length to make contact with the extremity of the index finger. One complete sub-series of the trip fingers is shown in side elevation in Fig. 47, from which it will be noted that all of the trip fingers of the sub-series are of the same elevation as above stated, but they gradually increase in radial length from the beginning of the sub-series towards the end, as shown in Fig. 45. Fig. 47 shows the last trip finger of one sub-series, all the trip fingers of the next sub-series and two trip fingers of an adjacent sub-series, so as to clearly show the different elevations between the intermediate sub-series and the fingers of the two adjacent sub-series. Preferably, the first sub-series of trip fingers reached by the index pins during the rotation of the turret are the lowest and the last sub-series are the highest, the different sub-series being arranged at successively higher elevations from the first sub-series towards the last. The first sub-series of trip fingers is, therefore, designed to co-operate with the lowermost index finger while the next sub-series of trip fingers is designed to co-operate with the next higher index finger and so on.

As a letter is deposited in one of the pockets of the turret by depressing one of the keys of the key-board, one of the index pins adjacent the pocket is simultaneously projected from the turret any one of ten distances. The letter will remain in the pocket until the trip finger is reached which is of proper height and radial length to make contact with the extremity of the projected index finger. When this trip finger is reached, a beveled surface 232 provided on the under surface of the index pin rides over a corresponding beveled surface 233 provided on the upper surface of the trip finger. This action is clearly illustrated in Fig. 51 from which it will be noted that as the index pin rides over the trip finger, the index finger is raised a sufficient distance to lift the sliding plate 14 and release the catch device 9, thus permitting the bottom 8 of the pocket to open and discharge the letter into the chute lying under the pocket. The spring 16 connected to the bottom of the pocket pulls the bottom of the pocket against a downwardly projecting portion 234 of the pawl 227 (see particularly Figs. 48 and 51), and thereby swings the pawl to its inoperative position and permits a coil spring 235 connected to the projected index pin and the bracket 15 to return the index pin to its normal position. It will be noted that when the bottom of the pocket opens, the spring 228 which normally holds the pawl 227 in its operative position is rendered less effective because the spring is connected to the movable bottom, and, therefore, when the bottom of the pocket is opened, the spring 228 does not prevent the spring 16 from moving the pawl to its inoperative position. When the pocket of the turret from which the letter has been discharged reaches its initial position beneath the chute 22, the bottom 8 of the pocket rides upon a cam 236 shown in Figs. 45 and 49, which has the effect of closing the bottom of the pocket and allowing the catch device 9 to move to its operative position and support the bottom of the pocket until again tripped during the next revolution of the turret.

As best shown in Figs. 45 and 48, the index pins are projected through the intermediary of the key-board by means of the sliding bars 237 of the key-board. These sliding bars are arranged in a horizontal series, but at different elevations and each sliding bar is provided at its extremity with a transverse arm 238 which brings the extreme index pin engaging portions 239 in a vertical row, as indicated in Figs. 18 and 48. There are ten of these sliding bars, one for each index pin of the series of index pins which lies in operative relation with the slide bars. Each of the slide bars 237 is adapted to be projected from the key-board any one of ten distances, thus making it possible to move any one of the index pins of the pocket lying adjacent the slide bars radially towards the trip fingers to any one of its ten positions.

The framework for supporting the key-board is shown at 240 in Fig. 45, and is preferably bolted to the turret casting at 241 and 242 to preserve the proper distance between the key-board mechanism and the turret mechanism. The construction of the key-board itself is shown in Figs. 15 to 17, and comprises a suitable casing in which the slide bars 237 above referred to are adapted to slide longitudinally, as shown in Fig. 16. Each key 243 of the key-board has a stem portion 244 projecting into the casing, and provided in its edge portion with two notches 245 and 246, the lowermost notch 245 being deeper than the upper notch 246. Extending transversely of the key-board between each two rows of keys is a rock shaft 247 journaled in the side walls of the casing. Each rock shaft 247 carries a downwardly inclined plate 248 which normally lies in the lowermost notches 245 of all of the keys of the adjacent row. There is one of these rock shafts 247 for each row of keys extending across the key-board. When any key in any row of the key-board is depressed, it, therefore, serves to swing the plate 248, secured to the adjacent rock shaft, against the tension of a coil spring 248' out of the lowermost notch 245. The plate then engages in the topmost notch 246 and the key is held in its depressed position against the tension of a coil spring 249 which tends to restore the key to its normal position. In causing the plate 248 to pass from the lowermost notch 245 to the upper notch 246, the rock shaft 247 is rocked a sufficient distance to cause a pin 250 carried by a depending arm 251 of the rock shaft to move a slide bar 252 longitudinally of itself towards the right in Fig. 15. The slide bar 252 is slidably mounted on that wall of the key-board casing adjacent which the arms 251 lie and is provided with a plurality of notches 253 forming at each notch, two spaced shoulders 254 and 255. When the rock shaft 247 is rocked in the manner just described, the pin 250 on the shifted arm 251 makes contact with the shoulder 255, and, therefore, moves the slide bar 252 in the manner just stated.

The longitudinal movement of the slide bar 252 to the right in Fig. 15 causes a pin 256 carried by the slide bar to engage with a bell-crank lever 257 pivotally connected to the link 48 heretofore described, which passes downwardly to the clutch. When the key is depressed, the link 48 is, therefore, lifted and the clutch causes the auxiliary shaft 35 of the actuating mechanism to make one revolution. During this one revolution of the shaft 35, a cam 258 keyed thereto co-operates with a cam lever 259 (Figs. 11 and 12) and permits a coil spring 260 to draw the cam lever towards the cam when the depression 261 in the cam approaches and lies adjacent the cam roller 262. This results in an upward movement of a link 263 pivoted to the cam lever at its lower end and to a rock shaft 264 of the key-board at its other end. The rock shaft 264 is journaled in the front and rear walls of the key-board casing and is actuated from the link 263 through the intermediary of the universal joint 265 and a rock arm 266 secured to the rock shaft 264.

Near each end of the rock shaft 264 is an upwardly projecting arm 267 between which extends a shaft 268 for actuating the slide bars 237 which set the index pins. It is obvious that as the rock shaft 264 is actuated, the shaft 268 is moved bodily around the axis of the rock shaft 264.

There is provided on the bottom of each slide bar 237, a projecting bracket 269 which normally makes contact with the shaft 268, it being understood that the entire series of depending brackets 269 makes contact with the single controlling shaft 268. A coil spring 270 is provided for each slide bar 237 and tends to withdraw the slide bar from the key-board as the spring is connected to the side wall of the key-board casing, as indicated at 271, and to the slide bar, as indicated at 272. Movement of the slide bars 237 by the springs 270, however, is normally prevented by the brackets 269 contacting with the controlling shaft 268. When one of the keys of the key-board is depressed and raises the link 263 through the intermediary of the cam 258 of the actuating mechanism, the controlling shaft 268 is moved in a clockwise direction (Fig. 16), thus permitting one and only one of the slide bars 237 to be moved from the casing by its spring a predetermined distance. This is accomplished as follows. Upon the upper surface of each of the slide bars 237, there are a plurality of projections 273 arranged in zigzag relation, as best shown in Fig. 17. The first one of the projections, 273ª adjacent the turret normally lies just behind the depending arm 251 of the corresponding rock shaft 247, but, as above stated, when one of the keys is depressed, the arm 251 on the rock shaft adjacent the depressed key is shifted, so that it will not lie in the path of movement of the adjacent projection 273ª. When the controlling shaft 268 is shifted, only one sliding bar 237 will, therefore, move towards the index pins as the end projection 273ª of all the slide bars, except one, will engage with the depending arms 251. The slide bar which moves will be the one which is released by the shifted arm 251, or in other words, will be the slide bar which lies directly under the row of keys in which the depressed key is located. It will, therefore, be seen that when any key on the key-board in any row is depressed, the slide bar located under and running parallel to such row of keys is projected from the side of the key-board a certain distance, which distance is controlled by the projections 273 on the slide bar and the stem of the depressed key, as will now be described.

It will be noted that all of the projections 273 on each slide bar 237, except the first two projections of each slide bar, are equally spaced. The first projection on each slide bar, indicated at 273ª, is merely for the purpose of contacting with the adjacent depending arm 251 to hold the slide bar stationary while the proper slide bar is being projected from the key board casing, in the manner above described. The other projections of each slide bar are equally spaced, as above stated, and are arranged in zigzag relation to constitute in effect a double row of projections on each slide bar, as will be clear from Fig. 17. When any key of the key-board is depressed, the stem 244 of such key is lowered into the path of movement of one of the projections 273 to stop the movement of the slide bar. Each projection is spaced from the stem with which it contacts a greater distance than the preceding projection. For instance, the projection 273ᵇ for contacting with the stem 244ª of the first key of the second row of the key-board is spaced from said stem 244ª such a distance that when the stem 244ª is depressed, the slide bar carrying the projection 273ᵇ will be arrested in its motion after it has moved a sufficient distance to move the corresponding index pin on the turret one notch. The second projection on each slide bar shown at 273ᶜ is spaced twice as far from the stem 244ᵇ of its key as the projection 273ᵇ. Consequently, when the stem 244ᵇ is depressed, the slide bar will move until the projection 273ᶜ contacts with the stem 244ᵇ, which will be a sufficient distance to move the index pin two notches. Likewise each of the other projections is spaced from the key-stem with which it contacts a greater distance than the preceding projection, so that the last projection on each slide bar, indicated at 273ᵏ, will move ten spaces before it contacts with the stem of its key, indicated at 244ʲ, since there are ten keys and ten projections on each slide bar for making contact with the stems of the keys.

It will be noted that towards the left-hand ends of the slide-bars 273 the projections on the slide-bars will have to move a greater distance than the space between the key-stems. Therefore, when certain keys near the left-hand side of the key-board are depressed, there may be a projection immediately to the left of the depressed key-stem, which projection should be permitted to pass and not contact with said key stem, as it is intended to contact only with the next key-stem to the right. For instance, the projection $273^i$ is intended to contact with the stem $244^h$ and not with the adjacent key-stem $244^i$. When the stem $244^i$ is depressed, the projection $273^i$ must, therefore, be permitted to pass the stem $244^i$, because the projection which is intended to contact with the stem $244^i$ is positioned at $273^j$. This may be accomplished by providing notches or recesses 274 at the lower corner of each of the key-stems. The notch or recess 274 is provided alternately first at one side and then the other side of successive key-stems, so that the uncut or projection portion 275 at the bottom of each key-stem will lie, when the key is depressed, in the path of movement of the projection intended to make contact therewith while the recessed portion will permit passage of the adjacent projection through the recess as both said recess and said adjacent projection are positioned at the other side of the slide bar. For instance, if the key-stem $244^i$ be depressed, it will not stop the projection $273^i$, since the key-stem $244^i$ is recessed or notched at its side adjacent the projection $273^i$. Even when the stem $244^i$ is depressed, the projection $273^i$ will pass the stem and not contact therewith. The other side of the stem $244^i$, however, is not recessed and will lie in the path of movement of the projection $273^j$, and hence when the stem $244^i$ is depressed, the slide bar under this stem will move until the projection $273^j$ contacts with the stem $244^i$. The slide bar will then have moved nine spaces. Likewise the key-stem $244^j$ will permit passage thereby of the projection $273^j$, since said key-stem is notched at the opposite side from the key-stem $244^i$. The unrecessed or projecting portion $244^j$ lies in the path of movement, when the key is depressed, of the last projection $273^k$ and, therefore, the slide bar will move until the projection $273^k$ comes in contact with the stem $244^j$, but the projection $273^j$ will pass through the notch or recess in said stem. Under these conditions, the slide bar will move ten spaces and the corresponding index pin will be moved ten notches or its maximum distance.

By the time any slide bar has moved to the limit of its movement and has properly set the corresponding index pin on the turret, the cam 258 of the actuating mechanism G will have made one complete revolution, so that the dwell 276 of the cam has rocked the cam lever 259 and retracted the link 263 to swing the controlling shaft 268 in an anticlockwise direction (Fig. 16) to return the projected slide bar to its normal position through the intermediary of its projecting bracket 269 contacting with the controlling shaft 268. Just before the cam 258 completes its revolution, a rise or projection 277 on the cam surface moves the cam lever 259 and the link 263 an additional amount which causes a projecting arm 278 (Fig. 16), constituting an extension to the rocker arm 266, to rise suddenly and make contact with the arm 279 of a pivoted bell-crank lever (Fig. 15). The other arm 280 of the bell-crank lever is designed to contact with the pin 256 on the slide bar 252 and, therefore, when the arm 280 of the bell-crank lever is actuated by the rise 277 of the cam, the slide bar 252 is moved an additional amount towards the right in Fig. 15. In moving this additional amount, one of the shoulders 253 thereon which is adjacent the pin 250 of the shifted arm 251 will contact with such pin and shift the arm 251 to remove its corresponding plate 248 from the upper notch of the depressed key and permit the spring on the key to return the same to its normal position. After the rise 277 of the cam has passed the cam roller, the parts will be returned to their normal position by means of the spring 257' acting on the lever 257 (Fig. 15).

It is possible that the operator may accidentally depress the wrong key just after reading the address upon the letter and may notice his mistake too late to prevent setting of one of the index pins adjacent the pocket to which the letter is delivered. For this reason, the key-board is provided with a special key, preferably termed an "error-key." This key is shown at 281 in Fig. 24 and its stem 282 is shown in section in the upper right-hand corner of Fig. 17. This key, together with another special key 283 to be presently described, constitute the only special keys on the key-board and all the others are utilized for purposes above described.

When the "error-key" is depressed, it acts upon one end of a lever 284 pivoted to the front wall of the key-board casing, as indicated at 285. When the lever 284 is depressed by the "error-key," it contacts with the second lever 286 projecting under the key-board and pivoted at 287 to the stationary plate 17 of the turret. The plate 286 is normally spring-held in contact with the lever 284 by means of a coil spring 288. The lever 286 extends beyond its pivot point 287 to a vertically movable rod 289 slidably mounted in the stationary plate 17. The rod 289 has a radially projecting finger 290, the extremity of which normally lies just below the extremity of the lowermost adjacent index finger. When the "error-key" is depressed, it is obvious that the rod 289 carrying the finger 290 may be raised and its extremity will then engage the under side of the lowermost index pin and serve to raise the same, and hence raise the plate 14 to trip the bottom of the pocket. The finger 290 is, therefore, positioned next to the pocket of the turret into which the letter is being discharged, as shown in Fig. 45. After the pocket in which the letter is erroneously deposited has been moved one space, the trip finger 290, in the event that the "error-key" is depressed after the mistake is noticed, will trip the bottom of the pocket and allow the letter to drop into a suitable receptacle provided for the purpose. It will, therefore, be seen that no chutes leading to pigeon-holes are provided for the first two positions of the pockets, since the first position, indicated at 291 in Fig. 45, corresponds to the filling position. The second position which the pocket assumes after being moved from under the feed chute, and indicated at 292, is the position in which the pocket discharges into the error receptacle. The pocket into which the letter is discharged must, therefore, be advanced two spaces to occupy the position 293 before the first chute is reached leading to a pigeon-hole. Consequently, no trip fingers 229 are provided for the first two positions 291 and 292 of the filled pocket, since no chutes lead from these positions to the pigeon-holes. Likewise one of the trip fingers 229 is omitted from the spaces indicated at 294 and 295, as the chutes which would normally pass under these points are omitted to accommodate the arms 296 and 297 of the casting which supports the key-board frame, and as there are no chutes provided at these points, the bottoms of the pockets must not be tripped, and, therefore, the trip fingers are omitted. This explanation accounts for the statement in the first part of the description that a chute is provided for every pocket, except four.

After the last letter has been delivered to the turret, it is obvious that there may still be a number of letters in the turret not yet delivered to their respective chutes and to make sure that the turret had been cleared of all its letters, the operator would have to depress a key one hundred times to effect one hundred movements of the turret, thus making certain that every pocket had passed its proper trip finger for tripping the bottom of the pocket. In order to avoid the necessity of successively actuating the turret one hundred times in this manner, a so-called "turret-clearing" mechanism is provided and is controlled from a "turret-clearing" key on the key-board, shown at 298 in Fig. 19. The stem of this key is shown in section at 283 in Fig. 17 and was just referred to above as the second special key of the key-board. When the key is depressed, a pin or stud 299 carried by the stem of the key oscillates an arm 300 about its pivotal connection 301. A second arm 302 oscillates unitarily with the arm 300 and acts upon a pin 303 carried by the slide bar 252, above described. When the key is depressed, the slide bar 252 is moved to the right, thus tripping the clutch and setting the actuating mechanism in operation. The key is held depressed until the projecting portion 278 (Fig. 16) of the rocker arm 266 rises and makes contact with an oscillating arm 304 projecting from the key-board casing and mounted to oscillate upon the axis 305 in the key-board casing (Figs. 19 and 22.) The oscillating arm 304 is thereby lifted. The depression of the key causes a pin 306 on the key-stem to engage with a projection 307 on a pivoted catch lever 308. The extremity of the catch lever 308 normally rests under a shoulder 309 of the oscillating arm 304 to prevent said arm from following the entire downward movement of the arm 278 with which it contacts during the normal operation of the machine. When the key 298, however, is depressed, the catch lever 308 is shifted to the position shown in Fig. 22, and, therefore, permits the arm 304 to follow the arm 278 as the latter is lowered. A spring-held pawl 310 carried by the arm 304 engages with the teeth of a ratchet 311 mounted to be rotated about the axis 305 by the oscillation of the arm 304. The ratchet 311 rotates unitarily therewith a disk or plate 312 having a single notch provided in its periphery shown at 313. This notch is normally engaged by the tooth 314 of the catch lever 315. As the ratchet 311 and plate 312 are rotated, the tooth 314 of the catch lever 315 is forced out of the notch 313 so that the heel 316 at the rear of the catch lever is caused to engage over a projection 317 formed on the key-stem. The catch lever 315, therefore, holds the stem of the key 298 in its depressed position until the arm 278 has permitted the oscillating arm 304 to make one hundred oscillations. As there are one hundred ratchet teeth provided on the ratchet wheel 311, the single notch 313 will return to its original position after the arm 304 has made its one hundred oscillations, at which time a coil spring 318 will pull the tooth 314 of the catch lever back into the notch 313 and release the key 298. When the key is released, the slide bar 252 is permitted to return to its normal position, the link 48 permitted to lower and the clutch members of the actuating mechanism thrown out of engagement. As the key 298 is held depressed while the arm 278 makes one hundred oscillations, and as said arm makes one oscillation for each movement of the turret, it is obvious that during the time the key 298 is held depressed, the turret will be moved one hundred spaces and give all of the letters in the turret a chance to be discharged.

In order to hold the ratchet wheel 311 stationary during the upward movement of the arm 304, a retaining pawl 319, best shown in Fig. 22, is provided. A coil spring 320 connecting the arm 304 with a stationary pin 321 moves the arm 304 downwardly each time the projecting arm 278 is lowered and tends to retain the arm 304 in contact therewith.

When the key 298 is restored to its normal position, the catch lever 308 is permitted to return under the shoulder 309 to hold the oscillating arm 304 from following the downward movement of the arm 278 during the normal operation of the machine.

Fig. 25 shows the detailed construction of one of the key-heads. It is obvious that any suitable type of key-head may be employed, just so it is capable of bearing an indication of the pigeon-hole which the letter will be delivered to when the key is depressed. Preferably the head of the key is encircled by a sleeve 321 capable of holding in place a glass or other transparent covering 322. Beneath the transparent covering 322 may be positioned the label 323 for bearing the indication.

As hereinbefore stated, there is a chute leading from, and supported by the stationary plate 17 under the turret, for each of a plurality of pigeon-holes or similar receiving boxes. When the turret is stationary, each of the pockets on the turret registers with the opening of one of the chutes, as best shown in Fig. 51, so that each time the turret comes to rest the pocket of the turret which has its bottom tripped is directly over a chute leading to one of the pigeon-holes. In the present instance, there are ninety-six of these chutes, but only two of the same are indicated at D in Fig. 2.

Obviously the specific arrangement and construction of the pigeon-holes or receiving boxes are immaterial to the invention, but preferably they are arranged somewhat as shown in Fig. 1, there being one pigeon-hole for each of the ninety-six chutes. The arrangement of the pigeon-holes and the chutes leading thereto will depend upon various circumstances, but where it is convenient to do so, they are preferably arranged as shown in the drawings, the pigeon-holes being arranged in vertical and horizontal rows and the chutes leading downwardly from the supporting plate 17 under the turret to the respective pigeon-holes.

At the lowermost end of each chute adjacent the pigeon-hole is a so-called "turning-box" indicated at 324 in Figs. 58 to 60. As all of the chutes may not be capable of discharging the letters into the respective pigeon-holes in a substantially horizontal position, i. e., flatwise, so it will lie flatly in the pigeon-hole, the turning-boxes are provided to insure delivery of the letters to the pigeon-holes in a plane parallel to the bottom of the pigeon-holes. No matter how the lower end of the chute may be twisted, or what position it assumes where it connects with the turning-box, the letter will be delivered in its proper position to the pigeon-hole. As will be seen in Figs. 58 and 59, the chute D therein illustrated delivers the letters to the turning-box in a substantially vertical plane. The turning-box is merely an enclosed casing of sufficient width and height to accommodate the letter in any position in which the letter happens to be delivered to the turning-box. Secured to one wall of the turning-box is a turning strip 325 of sheet-metal, which strip is twisted and secured at its other end to the back wall of the turning-box immediately above the discharge opening 326, through which the letter is discharged into the pigeon-hole. It will, therefore, be obvious that if the letter is not delivered to the turning-box in such a position that it will readily fall to a flat position on the bottom of the turning-box, the forward edge of the letter will strike the turning strip 325 and impart a twisting or turning movement to the letter and thereby deflect the same to the bottom of the turning-box. The letter then slides through the opening 326 formed in the lower part of the rear wall of the turning-box and communicating with the upper portion of one of the pigeon-holes E. The pigeon-hole with which the opening 326 communicates is indicated at 327. The letters delivered through the opening 326 in a flatwise condition fall to the bottom of the pigeon-hole. The next lower turning-box communicates with the next lower pigeon-hole 328 through an opening 329 similar in all respects with the opening 326 above described. Each turning-box in this manner discharges into the upper portion of one of the pigeon-holes.

The turning-boxes may be secured to the back walls of the pigeon-holes in any suitable manner, but preferably the turning boxes are provided with out-turned flanges 330 (Fig. 60) which may be secured directly to the rear walls 331 of the pigeon-holes.

The pigeon-holes or receiving boxes may be conveniently formed by providing a framework or casing 332 of wood, or other suitable material, and by sliding the tops and bottoms of the pigeon-holes into grooves or recesses formed in the uprights of the casing 332. This is illustrated in Fig. 62 in which 333 represents one of the uprights or dividing partitions of the casing 332, and 334 represents the edge portions of two of the tops or bottoms of the pigeon-holes. The top of one pigeon-hole will constitute the bottom of the pigeon-hole immediately above the same. As will be seen from Fig. 62, the edge portions of the tops or bottoms 334 may be slid in recesses or guideways formed in the side walls of the partitions 333 and may be retained therein by means of a clip 335 held in place on the partitions 333 by means of a screw or other fastening device 336. The extremities of the clip 335 overlie the corners of the tops or bottoms 334 and thereby hold the same in place.

The letters may be retained in the pigeonholes in any suitable manner, but preferably this is accomplished by means of a piece of stiff wire bent to substantially U-shaped form and hinged at its closed end to the top of the pigeon-hole for which it is intended. One of these wire-retaining devices is shown at 337 in Figs. 58 and 61 and is shown as pivotally supported from the top of the pigeon-hole by means of the clips 338. A coil spring 339 secured at 340 to the bent wire 337 and reacting at its other end against the top of the pigeon-hole serves to retain the wire-closure 337 in the position shown in Fig. 58, in which position the two lower extremities of the bent wire 337 engage with the bottom edge of the pigeonhole, as indicated at 341. It is obvious that the letters are normally retained in the pigeon-holes by the wire closure 337, but that the same may be readily swung to its open position to permit removal of the letters from the pigeon-hole.

A name-plate 342 may be associated with the wire-closure 337, as shown in Fig. 61, for the purpose of holding an indication, such as the name of a city or a certain train route, corresponding to a similar name or indication on one of the keys of the keyboard. All the letters discharged into any certain pigeon-hole are, of course, intended to go to the city or by the train route indicated on the name-plate 342 of that pigeonhole.

The operation of the complete apparatus is as follows. The electric motor 27 is started, but as all of the actuated parts of the apparatus, except the feed rollers and the elevator actuating mechanism, are actuated from the auxiliary shaft 35, which latter is only rotated when the clutch members 36 and 37 are engaged, all of the parts will remain stationary, except the feed rollers and the elevator actuating mechanism. These parts are driven from the continuously rotating pulleys 30 and 31 carried by the main actuating shaft 26, and, therefore, the feed rollers will continuously rotate and the worm wheel 113 will continuously rotate (Figs. 26 and 28,) as this worm wheel is driven from the worm 114 continuously rotated by means of the belt passing over the pulleys 116 and 30. The topmost shelf of the elevator being in engagement with the trip roller 101 will permit the catch 122 (Fig. 27) to engage in the notch 125 of the reciprocating bar 117, thereby holding the latter raised and preventing actuation of the same by the oscillating arm 116. It will, therefore, be seen that although a portion of the elevator actuating mechanism is continuously operating the elevator is not moved until the lever 108 is acted upon by the operator to permit movement of the topmost shelf from out of contact with the trip roller 101. Before this is done, however, a pile of letters to be classified and distributed are placed upon the lowermost shelves 88 of the elevator. If so desired, the letters may be brought directly from the canceling machine and placed upon the elevator A for distribution. When the letters are placed upon the shelves of the elevator, they should not be piled any higher on each shelf than the point indicated by a gauge 80' (Fig. 4) carried by the chains 80, because the pile would then be so high as to prevent dropping of the next higher shelf when the lever 108 is actuated to set the elevator in operation. If it is convenient to place a pile of letters upon each of the shelves of the elevator, this may be done, but if the proportions of the apparatus are such that only the lowermost shelves are conveniently accessible, the letters will be placed only upon the lowermost shelves. In any event, there will be an empty shelf in contact with the trip roller 101 and the topmost letter on the pile nearest to the trip roller 101 will obviously be spaced therefrom. The operator, therefore, actuates the handle or lever 108 which moves the upper movable portion 102 of the central elevator track bar to one side, thus permitting the roller 93 which supports the uppermost shelf on the central track bar to pass through the space that the movable portion 102 previously occupied, and thereby permitting lowering of the shelf.

The trip roller 101 is then permitted to lower until the clutch members 110 and 111 of the elevator actuating mechanism are engaged. The continuously rotating worm wheel 113 will then drive the upper sprocket wheels 86 of the elevator at their fastest speed and either bring the topmost letter of the first pile of letters into contact with the trip roller 101, or else bring another empty shelf into contact therewith, depending upon whether two empty shelves first intervened between the trip roller and the first pile of letters, or whether only one empty shelf, to wit, that shelf in contact with the roller, so intervened between the trip roller and the first pile of letters. If another empty shelf is brought into contact with the trip roller, the clutch members 110 and 111 will be thrown out of engagement and the operation of displacing the movable portion 102 of the central track bar by means of the handle or lever 108 will have to be repeated. If the pile of letters is brought into engagement with the trip roller 101, the clutch members 110 and 111 will be disengaged, but as the movement of the trip roller 101 is first relatively slow, due to the compressible nature of the pile of letters, the arm 121 actuated from the trip roller 101 will not be moved sufficiently far at first to allow the catch device 122 to engage in the notch 125 of the reciprocating bar 117, and, therefore, the cams 117' on the worm wheel 113 will serve to actuate the ratchet wheel 119 by reciprocating the slide bar 117 through the intermediary of the oscillating arm 116 (see particularly Fig. 26). As the ratchet wheel 119 is thus rotated with a step by step motion, it transmits this motion through the cushion springs 112' to the sprocket wheels 86 of the elevator, and thereby slowly elevates the pile of letters until the trip roller 101 is moved a sufficient distance to permit the catch lever 122 to retain the slide bar 117 in its raised position and thereby prevent further actuation of the ratchet wheel 119. The elevator will then come to a standstill with the topmost letter in engagement with the anti-friction rollers 126 and 127 journaled in the top plate of the elevator (Fig. 33).

The operator then depresses any key of the key-board to feed the topmost letter into the lifting plate 181 (Figs. 38 to 43, inclusive) of the reading frame. As no letter is as yet in position to be delivered to the turret, any key of the key-board may be depressed, as it is immaterial how the index pin of the pocket under the feed chute is set. By so depressing any key of the key-board, the slide bar 252 (Fig. 15) of the key-board is shifted to the right in the drawing, thereby raising the link 48 to engage the clutch members 36 and 37 of the actuating mechanism. The auxiliary shaft 35 will then make one complete revolution during which the shaft 207 on which the cam 215 is positioned will make one revolution, because this shaft is driven from the auxiliary shaft by means of the connecting shaft passing through the vertical casing 210. As the shaft 207 makes one revolution, the kicking or striking device 213 is operated from the cam 215 and the lifting plate 181 and fingers 194 are actuated from the cams 194' and 201, respectively, but as no letter has as yet reached the reading frame, these are idle movements of the kicking device and the lifting plate and supporting fingers of the mechanism associated with the reading frame. The rotation of the cam 215, however, will cause the cam 222 secured to its outer face to engage with the roller 223 of the link 150 for straightening the toggle 145—146 (Fig. 33) of the letter feeding friction rollers. The friction roller 129 is thus lowered into contact with the topmost letter of the pile, and as all of the friction rollers are continuously rotated, the letter will be fed forwardly off the pile and gripped at its forward end by means of the feed rollers proper 137 and 138. The forward edge of the letter in passing under the trip lever 155 will raise the same, thereby permitting the toggle 145—146 to break, due to the provision of the mechanism above described. When the trip lever 155 is thus raised and the toggle broken, the friction roller 129 will be elevated out of contact with the letter being fed, and there is, therefore, no danger of the friction roller 129 feeding the second letter of the pile. The feed rollers 137 and 138 deliver the letter to the lifting plate 181 of the mechanism associated with the reading frame. By this time the shaft 207 has made one complete revolution, and, therefore, the clutch members of the actuating mechanism will be thrown out of engagement and the parts will again come to rest.

It is then necessary to depress any other key of the key-board to advance the first letter to its second position and to feed the second letter from the pile on to the lifting plate 181. When the second key of the key-board is depressed, the shaft 207 will again make a complete revolution. The cams 194' and 201 are so shaped and so associated with the shaft 207 that when the same begins to rotate, the fingers 194 will first be moved from their normal position (Fig. 41) backwardly to the position shown in full lines in Fig. 43. The lifting plate 181 will then be lifted and the fingers 194 will follow immediately behind the plate 181 to remove the letter from the plate 181, as the latter is moved back to its normal receiving position. The first letter is then supported directly in back of the glass 204 of the reading frame by means of the fingers 194. The plate 181 is then in position to receive the second letter from the pile, which letter is fed to the plate 181 in the manner above described in connection with the first letter, after the plate 181 has reassumed its normal receiving position. By this time the shaft 207 has again made a complete revolution and the parts will, therefore, again come to rest. The first letter fed from the pile will then be in reading position in back of the glass 204 and the second letter will be supported upon the lifting plate 181.

The operator then reads the address upon the letter supported in back of the glass 204 and must now press the particular key for delivering the letter to the proper pigeon-hole. The address upon the letter will indicate that the letter is to be delivered to a certain city or to go by a certain train route and the operator will, therefore, depress that key upon the key-board which will deliver the letter to the pigeon-hole bearing the same indication as the depressed key. For instance, if the letter is addressed to Chicago, the operator will depress a key bearing the indication "Chicago," and the letter will be subsequently delivered to the pigeon-hole also bearing the indication "Chicago," as will hereinafter appear. If the letters are to be classified according to some other system, for instance, by train routes, the operator will depress the key bearing an indication of the train route by which the letter is to go, and the letter will then be delivered to the pigeon-hole bearing the same indication as the depressed key. The depression of this key again causes one complete revolution of the shaft 207, during the revolution of which the kicking or striking device 213 will first be operated to impart a striking movement to the edge of the letter, and thereby throw the same out of the reading frame unto the chute 222 leading to the turret. The fingers 194 will then be retracted, the plate 181 moved forwardly, and the second letter brought to reading position behind the glass 204. After the plate 181 returns to its receiving position, a third letter is fed from the pile on the elevator by means of the feed rollers, and then the parts will again come to rest. The cam 215 for controlling the kicking device 213 is so shaped and so related with the cams 194' and 201 that when the shaft 207 begins to rotate, the first action will be a quick and sudden movement of the kicking device to deliver the letter from the reading frame to the turret. The first letter having been removed by this means from in front of the fingers 194, said fingers are then free to be moved backwardly to bring the second letter forward into reading position behind the glass 204. When the shaft 207 makes one complete revolution, the parts controlled from this shaft, therefore, operate in the following sequence. The kicking device is first operated to remove a letter supported behind the glass 204 by the fingers 194 and deliver the same to the turret; the fingers 194 are then retracted or moved backwardly, and after they have reached their extreme backward position, the plate 181 is lifted and is followed by the fingers 194. After the fingers have removed a letter from the plate 181, the plate returns to its receiving position, and then a letter is delivered thereto by the feed rollers. When the parts come to rest, the kicking device is in proper relation with the edge of the letter to throw such letter into the turret upon the subsequent operation of the kicking device, the fingers 194 depend in back of a letter to support the same behind the glass 204, and the plate 181 rests in the position shown in Fig. 43 for receiving a letter from the feed rollers.

It will, therefore, be seen that it is necessary to depress three keys of the key-board to deliver the first letter to the turret, but after the machine is in operation, there will be a letter delivered to the turret at the depression of each key, as there will always be a letter in the reading frame ready to be discharged to the turret, which letter has been brought to its reading position by the depression of previous keys. The depression of the same key which so delivers a letter to the turret causes the turret to move one space, and this movement will result in a discharge of one or more letters from the turret, although at some movements of the turret, it is obvious that no letter will be discharged. After the machine is in operation, the operator merely has to take care to depress the proper key depending upon the address of the letter in front of him, and such letter will be delivered to its proper pigeon-hole while another letter will take the place of the one discharged from the reading frame, regardless of which key is depressed.

The depression of a certain key of the key-board depending upon the address of the letter will produce, in addition to the above results, the projection of one of the slide bars 237 from the key-board casing. The one which will be projected and the distance it will be projected will depend upon which key is depressed. If a key marked "Chicago," for instance, be depressed, the parts so associated and related that the slide bar lying under the row of keys in which the "Chicago" key is positioned, will move from the key-board casing a sufficient distance to set that index pin of the pocket in which the letter is to be delivered just a certain way, so that it will contact with the trip finger for controlling discharge into the Chicago chute. It will, of course, be understood from the above description of the apparatus that when the key is depressed, a vertical row of index pins on one of the pockets of the turret lies adjacent to the vertical row of extremital portions 239 of the slide bars 237. When any key on the key-board is depressed, except, of course, the special keys, the letters are advanced in the manner above described, and one of the index pins of the pocket which lies adjacent the chute 222 is properly set by one of the slide bars 237 of the keyboard. During the rotation of the auxiliary shaft of the actuating mechanism resulting from the depression of the key, the turret will be moved one space by the mechanism above described, but this will not be done until the letter is discharged from the reading frame by the kicking device through the chute 222 into a pocket of the turret. The last operation after the depression of each key is the resetting of the keys and slide bars 237 in the manner set forth above.

The movement of the turret will bring an empty pocket under the chute 222 and the pocket in which the first letter is delivered will have been advanced one space, but there is no possibility of said letter being yet discharged from the pocket and delivered to the pigeon-hole, as it then lies over the "error-receptacle". The letter will only be discharged from the pocket in the event that the error-key be depressed. For instance, if the operator notices that he has made a mistake after depressing one of the keys, he will then depress the error-key so that after the turret has advanced one space and the letter has reached its second position, the bottom of the pocket carrying the erroneously delivered letter may be released and the letter discharged from the turret. When a letter is properly delivered to the turret, it must, therefore, be advanced at least two steps before it can be delivered to one of the pigeon-holes. The bottom of the pocket carrying a letter may either be tripped in its third position, or in any of the other positions of the turret depending upon which trip finger is of the proper length and height to make contact with the set index pin of the pocket. It will be understood that after a certain index pin on a given pocket is set as the pocket lies under the feed chute, the pin stays set until it contacts with one of the trip fingers at some point during the rotation of the turret. When it so contacts with a certain trip finger, the bottom of the turret is tripped and the letter is delivered through the underlying chute to one of the pigeon-holes E. The opening of the bottom of the pocket permits returning of the set index pin to its normal position, in the manner hereinbefore described.

Each letter delivered to the turret is, therefore, rotated with the turret until the proper chute is reached for delivering the letter to the proper pigeon-hole. Each letter may, therefore, be rotated through only a few degrees, or it may be rotated through nearly 360° before it is delivered to its proper chute. There may, therefore, be a large number of letters in the turret at any one time, but as each letter must pass one certain trip finger which will trip the bottom of the pocket carrying the letter at some point during the rotation of the turret, it is obvious that each of the pockets will be emptied by the time it returns to its initial position under the chute 222. As each pocket assumes its position under the chute 222, the bottom of the pocket is automatically closed by the cam 236.

The index pins on the turret, of course, do not project far enough from the turret to make contact with the sliding bars 237 of the key-board and thereby interfere with the rotation of the turret. Each movement of the turret, however, for bringing an empty pocket under the chute 222 brings the extremities of the vertical row of index pins adjacent such pocket into alignment with the vertical row of the extremital portions of the slide bars of the key-board, the extremities of the index pins and the extremities of the slide-bars of the key-board being brought into close enough proximity to insure convenient setting of the index pins.

Each depression of a key of the key-board may not only deliver a letter to one of the pockets of the turret, but another letter or probably several letters, previously delivered to the turret may be discharged by the depression of the same key. After the machine is in operation, the depression of one key, therefore, controls all of the operations of the machine and after the operator reads the address on a letter and depresses the proper key, the letter will be automatically delivered to the proper pigeon-hole without any further attention on the part of the operator. As the same key will be depressed for all letters bearing the same address or intended to go by the same train route, such letters will all be delivered to the same pigeon-hole, and, therefore, the letters may be classified and distributed according to any desired system of classification.

After all of the letters are fed from the elevator, or if it be desired to stop the operation of the machine for any other reason, the "turret-clearing" key is depressed to cause the turret to be advanced one hundred spaces by the depression of this single key. The turret, therefore, makes one complete revolution without any further attention on the part of the operator, thus insuring delivery of all the letters which happen to be in the turret to their respective chutes and pigeon-holes.

From the foregoing, it will be seen that the construction of the apparatus is comparatively simple and that all of its parts operate in a reliable and efficient manner. As above stated, the apparatus shown in the accompanying drawings and herein described was designed especially for distributing mail matter, but obviously other articles may be distributed either with or without modifying the construction of any or all of the parts of the apparatus.

No matter what articles are distributed by the apparatus, it will be noted that if a key is depressed to dispose of one of the letters or other articles, it is not necessary to wait until the same reaches its destination before another key is depressed. As soon as the operator depresses a key the letter for which the key is depressed is practically disposed of so far as requiring the operator's attention is concerned. This is due to the fact that the turret is capable of carrying a large number of letters at one time, all of which are automatically distributed after they are introduced into the turret pockets. The apparatus is, therefore, very rapid in its operation, as the letters may be distributed as fast as the operator can read the addresses and depress the keys, allowing sufficient time, of course, between the depression of the keys to permit each depressed key to return to its normal position. When the depressed key returns to its normal position, the letter is safely deposited in one of the turret pockets, and, therefore, all is in readiness for the depression of the next key.

The same general principle of operation may be employed in machines constructed quite differently from that herein disclosed, and, therefore, numerous changes may be made in practically all parts of the apparatus without departing from the spirit or scope of the invention, as defined in the accompanying claims. Furthermore, it may be found desirable to vary the number of pockets used in the turret, the number of chutes leading to the pigeon-holes and the number of pigeon-holes themselves, it being immaterial, so far as the broad aspects of the invention are concerned, just what the capacity of the machine is. Although I prefer to use the specific type of each of the parts of the apparatus described, that is, the type of elevator disclosed with the type of key-board, letter-feeding mechanism and turret disclosed, yet it is obvious that any suitable type of any one of these parts may be used in combination with any suitable type of the other parts without altering the underlying principle of operation, which, in the present instance, is predicated upon the association and relation of the various parts rather than the specific construction thereof.

What I claim is:

1. Apparatus for distributing mail comprising a movable carrier having a plurality of letter-receiving pockets, a vertically disposed series of adjustable index pins for each of said pockets, means to feed letters into said pockets successively, means to adjust the position of one of said index pins of a pocket as the letter is fed thereto, a plurality of discharge chutes over which said pockets move, and a trip finger for each of said discharge chutes, said trip fingers being of different heights and lengths so that only one of the same will act upon each adjusted index pin during movement of the carrier to discharge the letter from the pocket into one of the discharge chutes.

2. Apparatus for distributing mail comprising a movable carrier having a plurality of letter-receiving pockets, a vertically disposed series of adjustable index pins for each of said pockets, means to feed letters into said pockets successively, means to adjust the position of one of said index pins of a pocket as the letter is fed thereto, a plurality of discharge points over which said pockets move, a trip finger associated with each of said discharge points, said trip fingers being of different lengths and heights so that one one of the same will engage with each adjusted index pin to discharge the letter from the pocket at a predetermined discharge point.

3. Apparatus for distributing mail comprising a movable carrier provided with a plurality of letter-receiving pockets having movable bottoms associated therewith, a vertical series of adjustable index pins associated with each pocket, means to feed letters from a common source of said pockets successively, means to adjust the position of one of the index pins of a pocket as a letter is fed thereto, a plurality of discharge chutes over which the pockets move, a trip finger for each of said discharge chutes, said trip fingers being of different heights and lengths so that one of the same will engage with each adjusted index pin to actuate the bottom of the pocket as said pocket registers with a predetermined discharge chute.

4. Reading mechanism for mail distributing mechanism, comprising a reading frame disposed in substantially an upright position, a letter-receiving plate disposed at a lesser inclination than the reading frame, means to feed letters to said letter-receiving plate, means to remove the letters therefrom and support them in back of the reading frame, and means to discharge the letters from the reading frame to the distributing mechanism.

5. Apparatus for distributing mail comprising an intermittently movable letter-transferring device movable in an endless path, means for feeding letters thereto, a plurality of discharge points over which said device passes, means for discharging each of the letters from said device at a predetermined discharge point, a key-board, means whereby the depression of a key of the key-board moves said transferring device one space, and means whereby the depression of a certain key of the key-board causes said transferring device to make a complete traversal of its endless path.

6. The combination with mail distributing apparatus involving an intermittently movable letter-transferring device movable in an endless path, of a key-board, the depression of a key of which moves said device one space, and means whereby the depression of a certain key of the key-board causes said device to make one complete traversal of its endless path.

7. Apparatus for distributing mail comprising a rotatable carrier provided with a plurality of letter-receiving pockets, a series of horizontally-slidable index pins associated with each of said pockets, means to feed letters to said pockets successively, a key-board disposed at the side of said carrier and from which one of the index pins of the pocket being filled may be set, a plurality of discharge chutes over which said carrier passes, and means engageable with the set index pins during the rotation of said member to open the pockets to discharge each of the letters from the carrier into a predetermined discharge chute.

8. Apparatus for distributing mail comprising a rotatable carrier having a plurality of letter-receiving pockets, a vertically-disposed series of adjustable index pins for each of said pockets, means to feed letters into said pockets successively, means to adjust the position of one of said index pins of a pocket as the letter is fed thereto, a plurality of discharge chutes over which said pockets rotate, and a circular series of radially-projecting stationary trip fingers, there being one trip finger for each discharge chute and said trip fingers being of different heights and lengths so that only one of the same will act upon each adjusted index pin during rotation of the carrier to discharge a letter from the pocket into one of the discharge chutes.

9. Apparatus for distributing mail comprising a movable carrier having a continuous series of letter-holding pockets, and selective mechanism for discharging letters from said pockets at predetermined points comprising a plurality of slidable index pins associated with each letter-holding pocket, each of said pins being capable of assuming any one of a plurality of different positions, means to adjust the position of said index pins, and means adapted to operate upon the adjusted index pins to discharge the letters from the carrier.

10. Apparatus for distributing mail comprising a movable carrier having a continuous series of letter-holding devices, and selecting mechanism for discharging letters from said pockets at predetermined points comprising a plurality of slidable index pins associated with each letter-holding device, each of said pins being capable of assuming any one of a plurality of different positions, a key-board by means of which any one of said pins may be moved to any one of its positions, and means co-operating with the adjusted index pins to discharge the letters from the carrier.

11. Apparatus for distributing mail comprising a movable carrier having a continuous series of letter-holding pockets, a series of adjustable index pins for each of said letter-holding pockets, each of said pins being shiftable longitudinally to any one of a plurality of different positions, means to shift any one of said index pins to any one of its positions, and a plurality of stationary trip fingers each of which is designed to contact with one index pin when the latter is adjusted to a predetermined position to discharge a letter from the carrier.

12. Apparatus for distributing mail comprising a movable carrier having a plurality of letter-receiving pockets, a vertically-disposed series of adjustable index pins for each of said pockets each of which is longitudinally-shiftable to any one of a plurality of positions, and a plurality of trip fingers of different heights and lengths so that one of said trip fingers will engage with only one of said index pins when the latter is in a predetermined shifted position to discharge a letter from the carrier.

13. Apparatus for distributing mail comprising a movable carrier having a continuous series of letter-holding pockets, a series of adjustable index pins for each of said letter holding pockets each of which pins is shiftable longitudinally to any one of a plurality of different positions, and means co-acting with said index pins to discharge the letters from the carrier.

14. Apparatus for distributing mail comprising a movable carrier having a continuous series of letter-receiving pockets, a series of adjustable index pins associated with each of said pockets, each of said pins being shiftable longitudinally to any one of a plurality of different positions, a key-board having means for shifting any one of said pins to any one of its several positions, and means adapted to co-act with said index pins during movement of the carrier to discharge the letters from the carrier.

15. Apparatus for distributing mail comprising a movable carrier having a plurality of letter-receiving pockets, a series of adjustable index pins associated with each of said pockets, each of said pins being shiftable longitudinally to any one of a plurality of different positions, a key-board by which said carrier moves having a series of longitudinally-shiftable bars, each of which is capable of contacting with and shifting to a predetermined extent one of the pins of any series of said index pins, and means coacting with said index pins during movement of the carrier to discharge the letters therefrom.

16. In a device of the class described a magazine adapted to receive flat articles, means for feeding articles singly therefrom, a rotary carrier, a series of receptacles arranged about the axis of the carrier, a series of distributors mounted on the carrier and adapted to be brought successively into registry with the magazine and with the respective receptacles, means for rotating the carrier comprising a shaft, a ratchet on said shaft, a pawl engaging the ratchet, an actuating shaft, a cam wheel on the shaft, connections from the cam wheel to the pawl for oscillating the latter, a normally rotating member loosely mounted on the actuating shaft and means for engaging said rotary member with the shaft.

In testimony whereof I affix my signature.

CHARLES O. BARNES.